US011257269B2

(12) United States Patent
Saito et al.

(10) Patent No.: US 11,257,269 B2
(45) Date of Patent: *Feb. 22, 2022

(54) INVERSE KINEMATIC SOLUTION BLENDING IN DIGITAL CHARACTER ANIMATION

(71) Applicant: Adobe Inc., San Jose, CA (US)

(72) Inventors: Jun Saito, Seattle, WA (US); James Acquavella, Seattle, WA (US); David Werner, Pleasanton, CA (US)

(73) Assignee: Adobe Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/080,747

(22) Filed: Oct. 26, 2020

(65) Prior Publication Data

US 2021/0074050 A1   Mar. 11, 2021

Related U.S. Application Data

(63) Continuation of application No. 16/415,915, filed on May 17, 2019, now Pat. No. 10,818,065.

(51) Int. Cl.
*G06T 13/40* (2011.01)
*G06T 7/00* (2017.01)
*G06T 7/70* (2017.01)

(52) U.S. Cl.
CPC ............ *G06T 13/40* (2013.01); *G06T 7/0002* (2013.01); *G06T 7/70* (2017.01)

(58) Field of Classification Search
None
See application file for complete search history.

(56) References Cited

U.S. PATENT DOCUMENTS 4,999,553 A * 3/1991 Seraji ..................... B25J 9/1643
                                                               318/628
10,319,133 B1 * 6/2019 Fleischer ................ G06T 13/40
(Continued)

OTHER PUBLICATIONS

Kulpa, Richard, Franck Multon, and Bruno Arnaldi. "Morphology-independent representation of motions for interactive human-like animation." Computer Graphics Forum. vol. 24. No. 3. Oxford, UK and Boston, USA: Blackwell Publishing, Inc, 2005. (Year: 2005).*

(Continued)

*Primary Examiner* — Yi Wang
(74) *Attorney, Agent, or Firm* — Keller Jolley Preece

(57) ABSTRACT

The present disclosure relates to systems, non-transitory computer-readable media, and methods for intelligently blending inverse kinematic (IK) solutions to more naturally depict joint positioning and/or movement of digital animated characters. In particular, in one or more embodiments, the character animation system can blend two IK solutions for an elbow joint based on a shoulder angle. For example, the character animation system can utilize a blending region to dynamically blend IK solutions as the shoulder angle moves through the blending region, thereby smoothly modifying bend direction and elbow position of the animated character arm. Based on the modified elbow position relative to a wrist position and a shoulder position, the animated character system can simulate more accurate, natural arm movements while reducing time and interactions needed to generate realistic animation sequences.

20 Claims, 13 Drawing Sheets

(56) References Cited

U.S. PATENT DOCUMENTS

| | | | |
|---|---|---|---|
| 10,818,065 B1 | 10/2020 | Saito et al. | |
| 2010/0123723 A1* | 5/2010 | Collard | G06T 13/00 |
| | | | 345/473 |
| 2010/0238182 A1* | 9/2010 | Geisner | G06T 13/00 |
| | | | 345/474 |

OTHER PUBLICATIONS

U.S. Appl. No. 16/415,915, dated May 7, 2020, Preinterview 1st Office Action.
U.S. Appl. No. 16/415,915, dated Jun. 26, 2020, Notice of Allowance.

* cited by examiner

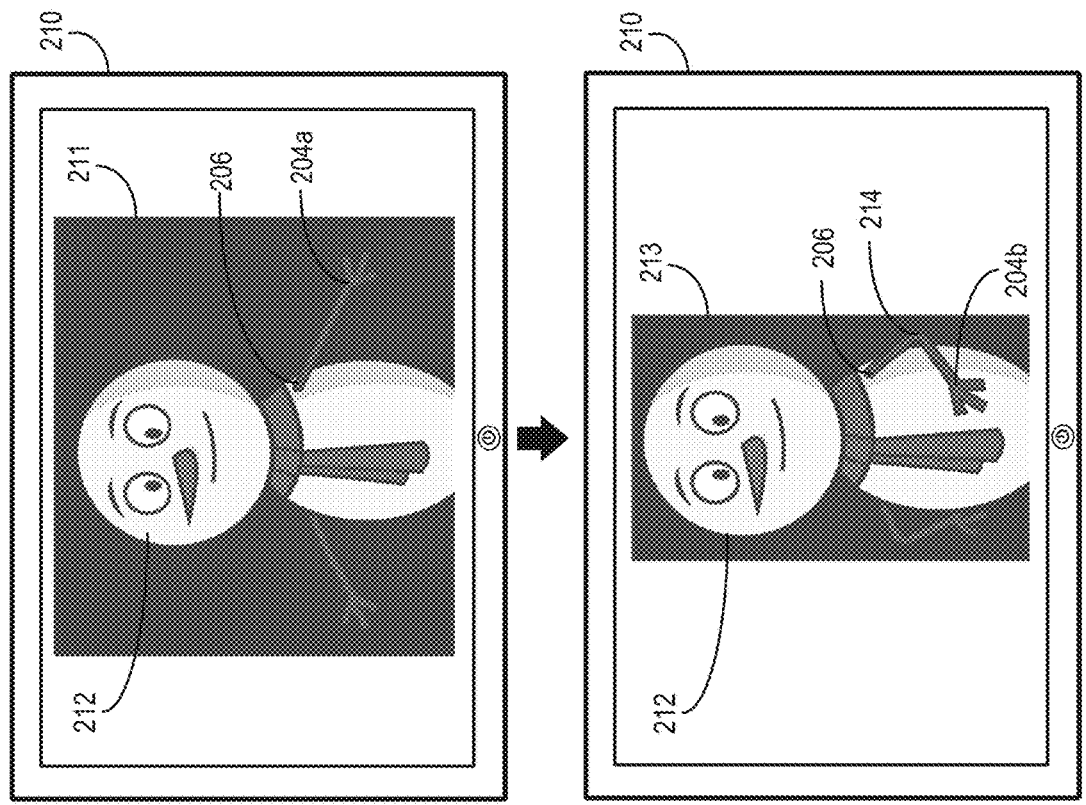
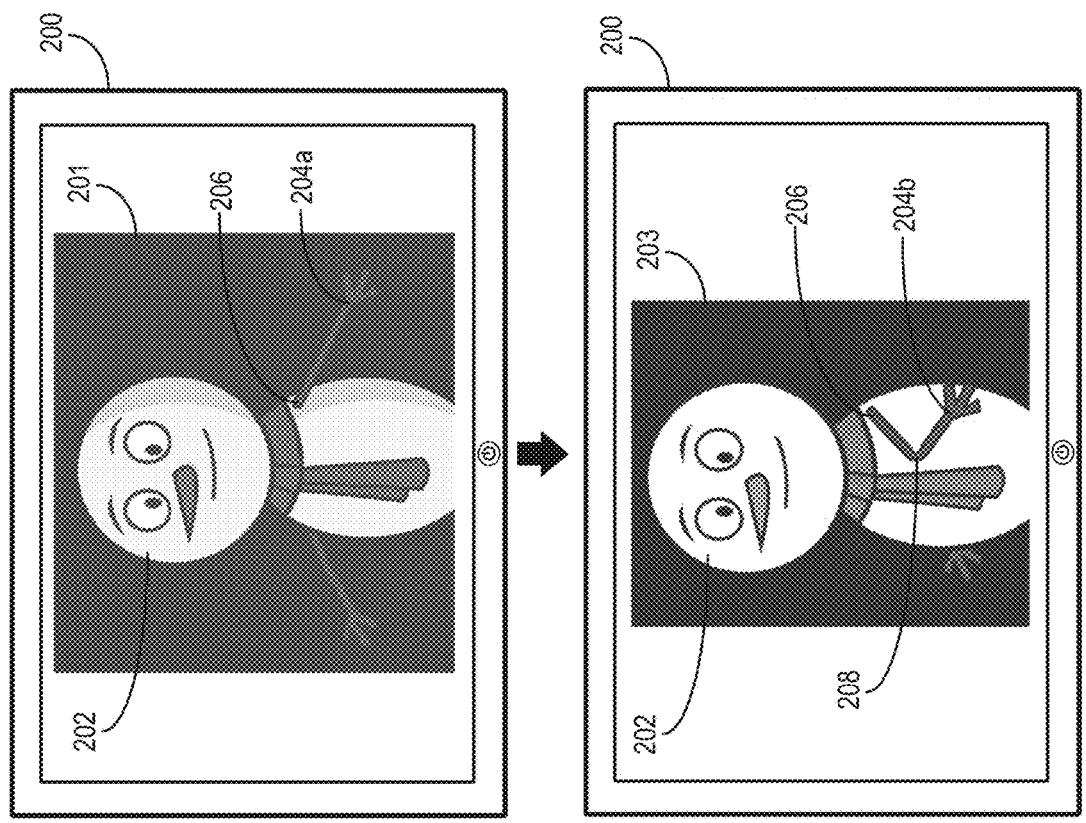
*Fig. 2B*
*Fig. 2A (Prior Art)*

INVERSE KINEMATIC SOLUTION BLENDING IN DIGITAL CHARACTER ANIMATION

CROSS-REFERENCE TO RELATED APPLICATIONS

The present application is a continuation of U.S. application Ser. No. 16/415,915, filed on May 17, 2019. The aforementioned application is hereby incorporated by reference in its entirety.

BACKGROUND

Recent years have seen significant improvements in computer systems for generating digital character animations. For example, conventional digital animation systems can employ inverse kinematic models to render movements of animated characters in digital animations. To illustrate, conventional systems can utilize inverse kinematic models to help determine positions of joints over time and then render an animated character that simulates movement based on the determined joint positions. However, a number of problems exist with conventional animation systems particularly in relation to accuracy and efficiency of operation.

BRIEF SUMMARY

Aspects of the present disclosure address the foregoing and/or other problems in the art with methods, computer-readable media, and systems that intelligently blend inverse kinematic (hereafter "IK") solutions to more naturally depict joint positioning and/or movement of digital animated characters. For example, in one or more embodiments, the disclosed systems can blend two IK solutions for an elbow joint based on a shoulder angle. Specifically, as the upper arm of an animated character moves down, the disclosed systems can incrementally blend multiple IK solutions, which pushes the elbow joint away from the body to help maintain a natural bend. In addition to generating a more accurate transitional bend angle of an animated character arm, this blending approach can produce a three-dimensional appearance by shortening the arm within a blending region. By intelligently blending two or more IK solutions within a blending region, the disclosed systems can efficiently generate smooth, accurate limb motions while reducing time and interactions needed to generate realistic two-dimensional animation sequences.

To illustrate, in some embodiments, the disclosed systems identify a wrist position and a shoulder position of an animated character (e.g., in a particular frame of an animated sequence). In addition, the disclosed systems can determine, based on the wrist position and the shoulder position, a first IK solution of a first elbow position and a second IK solution of a second elbow position. Based on a shoulder angle of the animated character, the disclosed systems can determine a modified elbow position by blending the first IK solution and the second IK solution. Furthermore, in some embodiments, the disclosed systems may generate a representation of the animated character based on the wrist position, the shoulder position, and the modified elbow position.

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

The detailed description provides one or more embodiments with additional specificity and detail through the use of the accompanying drawings, as briefly described below.

FIG. 2A illustrates frames from a digital animation from a conventional system.

FIG. 2B illustrates frames from a digital animation in accordance with one or more embodiments.

DETAILED DESCRIPTION

Figure 1:
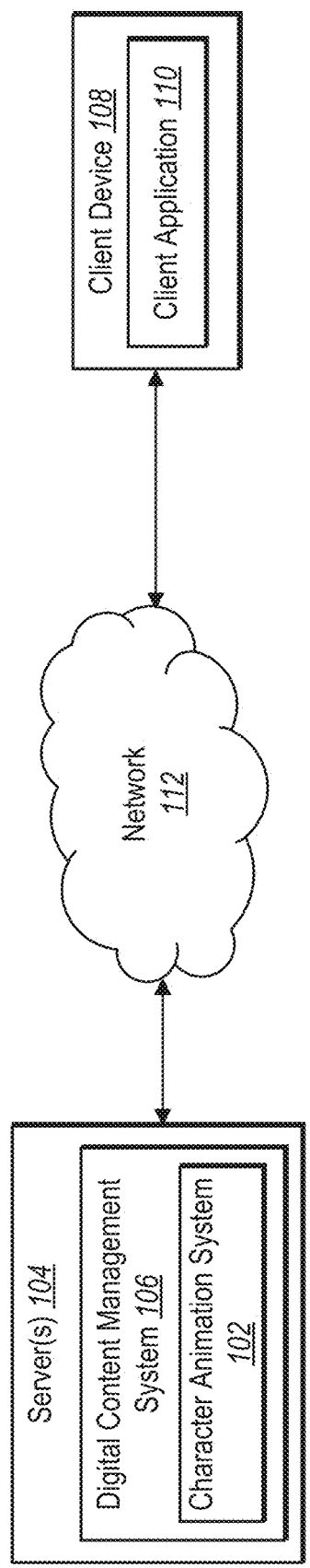
FIG. 1 illustrates a diagram of an environment in which a character animation system can operate in accordance with one or more embodiments.

This disclosure describes one or more embodiments of a character animation system that intelligently blends inverse kinematic (hereafter "IK") solutions to more naturally depict joint positioning and/or movement of digital animated characters. In particular, in some embodiments, the character animation system blends IK solutions based on a shoulder angle to determine more accurate, realistic elbow positions and arm movement in digital animations. For example, in response to detecting that a shoulder angle crosses a shoulder angle limit, the character animation system can alternate from one bending direction (corresponding to a first IK solution) to another bending direction (corresponding to a second IK solution) to maintain realistic arm bend across different movements. Moreover, the character animation system can utilize a transition angle to dynamically blend different IK solutions within a blending region, thereby smoothly modifying bend direction and elbow position to simulate a forearm arm rotating through an elbow joint. Furthermore, the character animation system can mimic a three-dimensional effect by dynamically shortening and/or lengthening an arm of the animated character as the arm rotates through the elbow joint. By intelligently blending IK solutions within a blending region, the character animation system can efficiently generate smooth, accurate arm movements while reducing time and interactions needed to generate realistic, two-dimensional animation sequences.

To illustrate, in some embodiments, the character animation system identifies a wrist position and a shoulder position of an animated character (e.g., in a particular frame of an animated sequence). In addition, the character animation system can determine, based on the wrist position and the shoulder position, a first IK solution of a first elbow position and a second IK solution of a second elbow position. Based on a shoulder angle of the animated character, the character animation system can determine a modified elbow position by blending the first IK solution and the second IK solution. Furthermore, in some embodiments, the character animation system generates a representation of the animated character based on the wrist position, the shoulder position, and the modified elbow position.

As mentioned above, the character animation system may use multiple IK solutions to determine bending direction and/or a modified elbow position of an animated character. As described in greater detail below, the character animation system can generate IK solutions reflecting different elbow positions that satisfy constraints, such as upper arm length, forearm length, shoulder position, and wrist position. For example, for two input joint positions with intermediate structural members surrounding a medial joint, two IK solutions generally exist for the position of the medial joint. The character animation system can determine each of these IK solutions and blend them to determine a modified position located between IK solutions (e.g., between a first elbow position of a first IK solution and a second elbow position of a second IK solution).

In some embodiments, the character animation system utilizes a blending region to smoothly blend between IK solutions. For example, when a shoulder angle falls outside a blending region, the character animation system can use a single IK solution to maintain a consistent arm bend. Upon detecting that a shoulder angle falls within the blending region, the character animation system can dynamically blend between IK solutions. Specifically, based on where a shoulder angle falls within a blending region, the character animation system can emphasize different IK solutions reflecting different bend directions to create more natural arm movements and/or arm configurations of the animated character.

In some embodiments, the character animation system may define the metes and bounds of the blending region based on a shoulder angle limit and/or a transition angle. As an example, the character animation system may employ a shoulder angle limit of the animated character to define where the elbow joint alternates between bending directions (e.g., alternates from one IK solution where the elbow points downward to another IK solution where the elbow points upward). In one or more embodiments, the character animation system provides a user interface for modification of the shoulder angle limit to allow for control over where the arm alternates from one bending direction to another. In one or more embodiments, the character animation system centers the blending region on the shoulder angle limit to naturally transition from one arm bending direction to another.

In addition to a shoulder angle limit, the character animation system can also define the bending region based on one or more transition angles. For example, the transition angle can define the range before and/or after the shoulder angle limit for blending different IK solutions. To illustrate, the character animation system can use a transition angle before the shoulder angle limit (to transition from an upward bending angle at the elbow joint) and a transition angle after the shoulder angle limit (to transition from to a downward bending angle at the elbow joint). In some embodiments, the character animation system provides a user interface for modification of the transition angle to allow for control over how abruptly the bending direction at the elbow will change for a particular animated character.

Upon determining a modified elbow position (from two IK solutions), the character animation system can also render a representation of the animated character. For example, the character animation system can render a representation of the animated character in a pose defined by the modified elbow position, the shoulder position, and the wrist position. Indeed, in this manner, as the character animation system receives input of different joint positions (e.g., user selection and movement of wrist and/or shoulder positions), the character animations can dynamically render representations of the animated character in different poses as part of a digital animation.

In some embodiments, the character animation system creates visual effects to further enhance more natural arm movement and/or arm configurations within a digital animation. As an example, by blending elbow positions from different IK solutions, the character animation system can generate a representation of an animated character with shortened arms within the blending region. Shortening arm length within a blending region may create a three-dimensional visual effect of rolling the forearm through the elbow joint of the animated character.

In addition, the character animation system can also switch art layers to more realistically render the limbs of an animated character. For example, as an arm moves through a blending region, the character animation system can alternate through digital image layers of the arm during rendering to give the appearance that the arm is rotating. By cycling through these layers, the character animation system can provide digital images of the back of the forearm, the side of the arm, and the front of the forearm to simulate rotation within a digital animation.

As mentioned above, a number of problems exist with conventional animation systems particularly in relation to accuracy and efficiency of operation. As one example, conventional animation systems fail to accurately depict natural movement of animated characters. For instance, in generating two-dimensional animations, conventional systems use inverse kinematics to determine a joint position and maintain a consistent bend direction of limbs (e.g., arms) for animated characters. However, in many circumstances, such as elbow joints in arms, conventional animation systems generate limbs with unnatural, unrealistic bending angles. In more detail, as an arm of an animated character moves, conventional animation systems can generate an arm with an elbow position that appears contorted relative to normal arm configurations.

In addition to generating inaccurate animated characters, conventional character animation systems can also require excessive time and user interaction with user interfaces. For instance, to remedy or mitigate unnatural or contorted arm configurations, conventional systems often require tedious frame-by-frame adjustments to the animated character. The user interface of conventional character animation systems may, in turn, receive frame-by-frame adjustment inputs to make positional corrections to an initial result. In some cases, the user interface may receive tens, hundreds, thousands, or even hundreds of thousands of manual inputs to the user interface for relocating various portions of an animated character.

Some conventional systems seek to generate more realistic animated characters by implementing complex, computationally-heavy machine learning models (such as neural networks). These approaches require significant computational resources to train and implement in generating digital animations. These additional computational resources can significantly reduce real-time execution speeds and even exclude implementation on some client devices with limited processing power.

The character animation system provides many advantages and benefits over these conventional systems and methods. For example, by blending multiple IK solutions, the character animation system improves accuracy of arm movement and/or arm configuration relative to conventional systems. Specifically, as an arm of the animated character moves, the character animation system can automatically adjust the positioning of the elbow joint of the arm based on shoulder angle and multiple IK solutions to create a more natural bend consistent with normal arm configurations.

In addition to improving accuracy of animated characters, the character animation system can reduce the time and user interaction with user interfaces typically required of conventional systems. Instead of manually adjusting the positioning of the elbow in a tedious frame-by-frame manner, the character animation system of the present disclosure can automatically modify the positioning of the elbow with minimal user input. For example, the character animation system can detect press and drag gestures in relation to a wrist joint. In response, the character animation system can dynamically determine elbow joint positions and render an accurate, natural animation sequence of the animated character that tracks movement of the drag event in relation to the wrist joint.

Moreover, the character animation system can reduce computational overhead relative to conventional systems by blending two or more IK solutions. The blending approach described herein requires very little computational power, and can avoid the excessive computer resources needed to train and/or apply complex machine learning models. The character animation system of the present disclosure can also improve on-the-fly character animation because data corresponding to real-time execution speeds is not throttled or otherwise competing for computation bandwidth.

As illustrated by the foregoing discussion, the present disclosure utilizes a variety of terms to describe features and advantages of the character animation system. Additional detail is now provided regarding these and other terms used herein. For example, as used herein, the term "animated character" refers to a graphical representation of an object, person, or animal. In particular, an animation character can refer to a digital representation of an object, person, or animal depicted as a moving body or element. An animated character may include a two-dimensional animated character (e.g., a vector-based animation) or a three-dimensional animated character. As described in greater detail below, an animated character can include a plurality of structural members (e.g., upper arm, forearm, head, torso, upper leg, lower leg, and/or foot) connected to a plurality of joints (e.g., shoulder joint, wrist joint, elbow joint, knee joint, ankle joint, and/or hip joint). For example, an animated character may include a bear, a human, a tree, a snowman, a cartoon character, or other bodies that can be digitally manipulated to simulate the appearance of movement.

As just mentioned, the character animation system can generate animated characters with a plurality of joints. The character animation system can simulate movement by modifying the joint position (and the position of connecting structural members). Further, as used herein, the term "joint position" refers to a location of a body area associated with a joint. In particular, the joint position may include a location at which a first structural member is connected to a second structural member of an animated character. For example, the joint position may include coordinates (e.g., an X-coordinate and a Y-coordinate according to an X-Y coordinate system) that are associated with the joint and that positionally reference the joint within a character animation frame.

To illustrate, as used herein, the term "wrist position" refers to a location of an animated character associated with an arm region that includes a wrist area. In particular, the wrist position may include a location at which a hand pivotally connects to an arm of the animated character (e.g., at a wrist joint). Similarly, the term "shoulder position" and "elbow position" refer to locations of an animated character associated with arm regions that include a shoulder area and elbow area, respectively. For instance, the shoulder position may include a location at which the arm is movably connected to a body (or torso) of the animated character (e.g., at a shoulder joint). Similarly, the elbow position may include a location at which the forearm (i.e., a lower portion of the arm above the wrist) is movably connected to an upper arm (e.g., a portion of the arm below the shoulder) of the animated character, for example at an elbow joint. Although many examples of the present disclosure focus on wrist, elbow, and shoulder joints, the character animation system can operate in conjunction with any two joints (e.g., a first joint and a second joint) connected to a middle joint. Additionally or alternatively, the character animation system can operate in conjunction with limb portions or limb segments that may include multiple joints (e.g., multiple joints between a shoulder joint and a wrist joint). Similarly, the character animation system can operate with limbs or limb segments that may not include any intermediate joint (e.g., a flexible member that includes an elbow position, but no elbow joint, between the shoulder joint and the wrist joint).

Further, as used herein, the term "digital animation" refers to a sequential display simulating motion of an animated character. In particular, a digital animation can include a plurality of frames that, when displayed sequentially, portray an animated character in motion. For example, a digital animation can include a digital movie portraying movement of an animated character. A digital animation can also include a user interface portraying movement of an animated character in response to real-time user input (e.g., selection and movement of joints of an animated character to simulate movement of the animated character).

In addition, as used herein, the term "frame" refers to a digital image, time, or window of a digital animation. In particular, the frame may include a rendering on a user interface at a particular time that portrays an animation character in a particular pose. Similarly, a frame may include a digital image that is part of a digital movie portraying an animation character in a particular pose.

Moreover, as used herein, the term "inverse kinematic solution" or "IK solution" refers to a pose of an animated character (e.g., a joint position and/or member position of an animated character) determined by a computer algorithm (e.g., an inverse kinematic computer algorithm). In particular, the IK solution may include positional data and/or parameters for a particular joint determined by an inverse kinematic algorithm given positional data and/or parameters of other joints. For example, the IK solution may include an elbow position given a wrist position and a shoulder position subject to constraints regarding arm length (e.g., forearm length and upper arm length). Additional detail regarding inverse kinematic operations is described below.

As used herein, the term "shoulder angle" refers to a relative orientation of the upper arm of an animated character. In particular, the shoulder angle may include an angle at which an upper arm is oriented relative to a reference plane (e.g., relative to a plane aligned with the torso, neck, legs, vertical direction, horizontal direction, or other direction of an animated character and/or frame). For example, the shoulder angle may include the angle between the upper arm and the torso of the animated character. The shoulder angle can be expressed in a variety of different forms (e.g., radians, degrees, or distance). In some embodiments, the character animation system determines a shoulder angle by identifying a vector between an elbow position and a shoulder position then determining an angle between the vector and a reference plane.

Further, as used herein, the term "representation" (or "representation of an animated character") refers to a graphical rendering of an animated character. In particular, the representation may include a visual rendering of an animated character in a particular pose (e.g., with particular colors, shapes, textures, styles, and/or accessories). For example, the representation may include the animated character in a pose with one arm hanging down and the other arm raised.

In addition, as used herein, the term "blending region" refers to a range of angles or orientations for blending IK solutions. In particular, the blending region may include a range of angles between a first angle and a second angle, between which the character animation system may transition between a first bending direction (corresponding to a first IK solution) and a second bending direction (corresponding to a second IK solution).

As used herein, the term "shoulder angle limit" refers to an orientation of the shoulder corresponding to a limit, threshold, or alteration of an elbow bending direction. In particular, a shoulder angle limit can include a limit to the shoulder angle where a first elbow bending direction changes to a second elbow direction (i.e., the elbow bending direction will change upon the shoulder angle reaching the shoulder angle limit). Additionally, the shoulder angle limit may include a shoulder angle of the animated character at which a given IK solution has reached (or approximately reached) the extent of feasible arm movement, natural appearance, etc.

Moreover, as used herein, the term "central angle" refers to an orientation (e.g., an angle) that corresponds to the center or middle of a blending region. In some embodiments, the shoulder angle limit defines the central angle of the blending region. For example, the transition angle can define the outer limits of the blending region relative to this central angle.

Further, as used herein, the term "smoothstep function" refers to a computer algorithm that interpolates between data points. In particular, a smoothstep function can analyze an input between a minimum threshold and a maximum threshold and interpolate, using a Hermite polynomial, between two numbers (e.g., 0 and 1). For example, a smoothstep function can analyze a shoulder angle between a first transition angle and a second transition angle and interpolate between two numbers (e.g., 0 and 1) that are utilized as a weight to blend between two IK solutions. Additionally, by weighting based on proximity of the shoulder angle to the outer boundaries of the blending region (e.g., the transition angles of the first angle and the second angle), the smoothstep function may skew the modified elbow position towards one of the first elbow position or the second elbow position.

As used herein, the term "arm length" refers to a measure of length of an arm of an animated character. In particular, the arm length may include a distance of the arm that spans from the shoulder to the elbow joint and from the elbow joint to the hand of the animated character.

In addition, as used herein, the term "art layer" refers to a rendering layer. In particular, the art layer may include a digital image or rendering portraying a portion of an animated character. For example, an art layer of an arm can include a digital image of the arm (e.g., an arm showing the front of the forearm, the back of the forearm, or the side of the forearm). As described in greater detail below, different art layers can be associated with different shoulder angles within a blending region.

Additional detail will now be provided regarding the character animation system in relation to illustrative figures portraying example embodiments and implementations of the character animation system. For example, FIG. 1 illustrates an environment for implementing a character animation system 102 in accordance with one or more embodiments. As shown in FIG. 1, the environment includes server(s) 104, a client device 108, and a network 112. Each of the components of the environment can communicate via the network 112, and the network 112 may be any suitable network over which computing devices can communicate. Example networks are discussed in more detail below in relation to FIG. 7.

As mentioned, the environment includes a client device 108. The client device 108 can be one of a variety of computing devices, including a smartphone, tablet, smart television, desktop computer, laptop computer, virtual reality device, augmented reality device, or other computing device as described in relation to FIG. 7. Although FIG. 1 illustrates a single client device 108, in some embodiments the environment can include multiple different client devices, each associated with a different user. The client device 108 can further communicate with the server(s) 104 via the network 112. For example, the client device 108 can receive user input and provide the information pertaining to user input (e.g., edits to a digital animation, animated character preferences, etc.) to the server(s) 104.

As shown, the client device 108 includes a client application 110. In particular, the client application 110 may be a web application, a native application installed on the client device 108 (e.g., a mobile application, a desktop application, etc.), or a cloud-based application where part of the functionality is performed by the server(s) 104. The client application 110 can present or display information to a user, including digital content as part of a digital content editing application, such as a digital animation application. A user can interact with the client application 110 to provide user input to, for example, modify a digital animation of an animated character. For example, the client application 110 can provide a digital animation user interface including various editing tools and menus, such as options to select and drag objects as desired (e.g., to move a hand of an animated character and correspondingly move an arm of the animated character).

As illustrated in FIG. 1, the environment includes the server(s) 104. The server(s) 104 may generate, store, receive, and transmit electronic data, such as executable instructions for naturally positioning an arm of an animated character by blending IK solutions. For example, the server(s) 104 may receive data from the client device 108 in the form of user input to move a hand of an animated character from a first position to a second position. In turn, the server(s) 104 can transmit data to the client device 108 to provide a modified digital animation of an animated character. The server(s) 104 can communicate with the client device 108 to transmit and/or receive data via the network 112. In some embodiments, the server(s) 104 comprises a content server. The server(s) 104 can also comprise an application server, a communication server, a web-hosting server, a social networking server, or a digital content management server.

Although FIG. 1 depicts a character animation system 102 located on the server(s) 104, in some embodiments, the character animation system 102 may be implemented by on one or more other components of the environment (e.g., by being located entirely or in part at one or more of the other components). For example, the character animation system 102 may be implemented by the client device 108 and/or a third-party device.

As shown in FIG. 1, the character animation system 102 is implemented within a digital content management system 106 located on the server(s) 104. The digital content management system 106 can edit, create, manage, and/or transmit digital animations with animated characters.

In some embodiments, though not illustrated in FIG. 1, the environment may have a different arrangement of components and/or may have a different number or set of components altogether. For example, the environment may include a third-party server (e.g., for storing animated characters or other data). As another example, the client device 108 may communicate directly with the character animation system 102, bypassing the network 112.

As discussed above, the character animation system 102 can more naturally depict an arm of an animated character relative to conventional systems. For example, FIG. 2A illustrates a computing device 200 rendering frames of an animated character 202 in a digital animation utilizing a conventional system. As shown in FIG. 2A, the conventional system generates the animated character 202 with an elbow position in an awkward, unnatural position based on a shoulder position 206. In particular, FIG. 2A illustrates results following user input modifying a wrist position 204a in an initial frame 201 to a wrist position 204b (with the shoulder position 206 remaining constant) in a subsequent frame 203. As shown, in the subsequent frame 203, the conventional system generates an elbow position 208 with a bending direction that appears distorted and unnatural. Specifically, the conventional system places the elbow in the subsequent frame 203 approximately mid-torso with an incorrect bend direction, thereby creating an abnormal arm configuration for the animated character 202. Thus, as illustrated in FIG. 2A, although conventional systems can position limbs, they often fail to accurately and naturally place intermediate joints (such as an elbow) to generate natural arm configurations.

In contrast, FIG. 2B illustrates the character animation system 102 rendering a representation of an animated character 212 in a digital animation via a computing device 210 in accordance with one or more embodiments. As shown in FIG. 2B, the character animation system 102 receives user input modifying the wrist position 204a in an initial frame 211 to the wrist position 204b in a subsequent frame 213 (without movement of the shoulder position 206). In response, the character animation system 102 generates the animated character 212 with a modified elbow position 214 and corresponding bending direction.

Specifically, the character animation system 102 identifies two IK solutions corresponding to the wrist position 204b and the shoulder position 206. The character animation system 102 identifies a shoulder angle and determines that the shoulder angle falls below a shoulder angle limit. In response to determining that the shoulder angle satisfies (e.g., falls below or exceeds) a shoulder angle limit, the character animation system 102 selects a bending direction (e.g., an IK solution corresponding to an inward/downward bending direction).

In addition, the character animation system 102 determines that the shoulder angle falls within a blending region. Accordingly, in addition to determining an inward blending direction, the character animation system 102 blends the two IK solutions based on the shoulder angle. Specifically, the character animation system 102 places the elbow to the side of the torso and dynamically blends the IK solutions as the animated character 202 transitions through the blending region to create a smooth, natural transition. In this manner, the character animation system 102 can create realistic, natural movements through different frames of a character animation.

Although FIG. 2B illustrates the character animation system 102 generating a modified elbow position and bending direction based on movement of a wrist joint toward the torso of the animated character 202, the character animation system 102 can generate a modified elbow position based on different movements of various joints within a digital animation. For example, in response to movement of a wrist joint in an upward direction, the character animation system 102 can determine an upward bending direction and blend IK solutions as the wrist joint moves upward through the blending region. Similarly, the character animation system 102 can determine movement of a shoulder joint to a new position and determine a modified elbow joint position by blending IK solutions based on the new shoulder joint position and wrist position.

As just discussed, the character animation system 102 can generate and blend IK solutions. For instance, FIG. 3A illustrates two example IK solutions identified by the character animation system 102 for a given wrist and shoulder position, in accordance with one or more embodiments. Specifically, FIG. 3A shows a first IK solution 302 and a second IK solution 304 based on a shoulder position 306 and a wrist position 308. As shown in FIG. 3A, the first IK solution 302 includes a first upper arm position 312a, a first elbow position 310a, and a first forearm position 314a based on the shoulder position 306 and the wrist position 308. Further, the second IK solution 304 includes a second upper arm position 312b, a second elbow position 310b, and a second forearm position 314b based on the shoulder position 306 and the wrist position 308. In particular, the first IK solution 302 results in a first (outward/upward) bend direction of the arm, and the second IK solution 304 results in a second (inward/downward) bend direction of the arm.

The character animation system 102 generates the first IK solution 302 and the second IK solution 304 based on geometric and/or trigonometric relationships. For example, by positionally constraining the shoulder position 306 and the wrist position 308, and by constraining lengths of the upper arm and forearm, the animated character may include two potential upper arm positions (e.g., the first upper arm position 312a and the second upper arm position 312b), two potential elbow positions (e.g., the first elbow position 310a and the second elbow position 310b), and two potential forearm positions (e.g., the first forearm position 314a and the second forearm position 314b). In this manner, at least two IK solutions may exist for each pair of shoulder position 306 and wrist position 308.

As mentioned, the character animation system 102 can utilize an inverse kinematic algorithm to generate the first IK solution 302 and the second IK solution 304. An inverse kinematic algorithm can model an animated character as a skeleton of rigid segments connected with joints, referred to as a kinematic chain. Given fixed positions/angles of some joint positions, an inverse kinematic algorithm can determine joint angles/positions of other joints within the kinematic chain subject to one or more constraints (e.g., limb length). Specifically, in some embodiments, the character animation system 102 may use an analytic solver that receives as input an end pose (e.g., a user-defined position for a shoulder joint and/or wrist joint of the animated character) and provides joint positions as output. An example of an analytic solver includes IKFast that can analytically solve the kinematics equations of a complex kinematics chain.

In some embodiments, the character animation system 102 may approximate solutions to IK systems using iterative optimization. In one type of approximation and/or optimization method, the character animation system 102 can use the Jacobian inverse technique to determine an IK solution. In other embodiments, the character animation system 102 can determine IK solutions using heuristic methods. Under heuristic methods, the character animation system 102 can perform iterative operations to gradually lead to an approximation of the IK solution. Some example heuristic algorithms are the Cyclic Coordinate Descent algorithm and the Forward And Backward Reaching Inverse Kinematics algorithm. In these or other embodiments, inverse kinematic algorithms may not produce two guaranteed solutions (e.g., the algorithms may not produce two finite, analytical solutions). In such circumstances, the character animation system 102 can set up and constrain IK systems (e.g., constrain the inverse kinematic algorithm to particular bending directions or limits). For example, the character animation system 102 can set up two (or more) IK systems (each subject to particular constraints, such as bending direction), solve the constrained IK systems, and blend their results.

Although not illustrated in FIG. 3A, in some embodiments, an animated character may include multiple joints between the shoulder position 306 and the wrist position 308 (hereafter "in-between joints"). In this scenario, an inverse kinematic algorithm may not achieve an analytical solution for the multiple in-between joints. Similar to the approached just discussed, in some embodiments the character animation system 102 may set up two (or more) constrained IK systems (e.g., to keep joints bent in pre-determined directions, such as opposite directions). The character animation system 102 can solve the two (or more) constrained IK systems to obtain a set of IK solutions, and blend the results.

Although not illustrated, in some embodiments, an animated character may include no in-between joints (e.g., for an animated character having a flexible hose-like arm). In this scenario, the character animation system 102 may still blend elbow positions (i.e., elbow regions without an actual elbow joint). To illustrate, the character animation system 102 can blend elbow positions of IK solutions by blending endpoint rotations of a flexible limb. For example, the first upper arm position 312a and the first forearm position 314a may form a first continuous IK solution without the first elbow position 310a. Similarly, the second upper arm position 312b and the second forearm position 314b may form a second continuous IK solution without the second elbow position 310b. Accordingly, the character animation system 102 may blend the first continuous IK solution and the second continuous IK solution by blending the endpoint rotations or angles of the arm (e.g., blending the rotations of two IK solutions at the end of the flexible arm member). The character animation system 102 can then generate a blended arm with a blended elbow position by blending the endpoint rotations or angles.

As discussed above, the character animation system 102 can determine a bending direction and/or blend IK solutions based on a shoulder angle. In particular, the character animation system 102 can select an IK solution corresponding to a bend direction based on a shoulder angle and a shoulder angle limit. Moreover, the character animation system 102 can blend IK solutions within a blending region defined by a shoulder angle limit and transition angles.

Figure 3B:
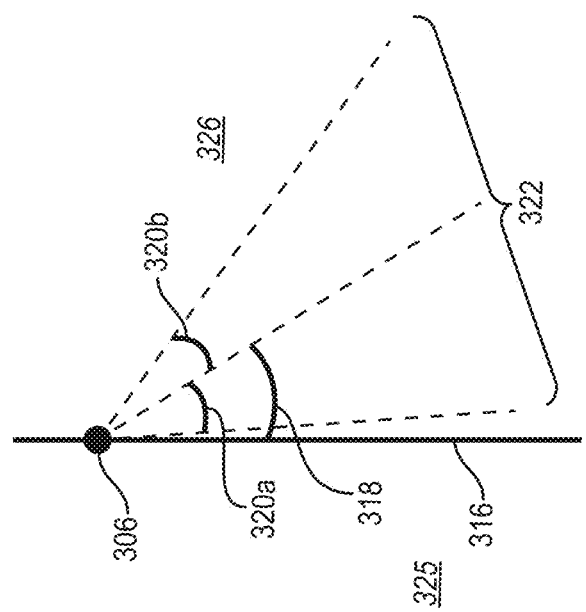
FIG. 3B illustrates a schematic diagram of a blending region in accordance with one or more embodiments.
Figure 3A:
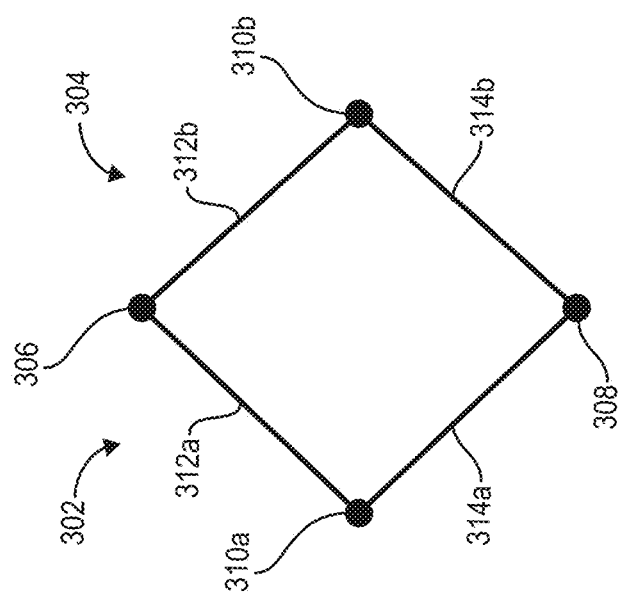
FIG. 3A illustrates a schematic diagram of IK solutions of an animated character in accordance with one or more embodiments.

For instance, FIG. 3B illustrates a blending region 322 in accordance with one or more embodiments. FIG. 3B shows the blending region 322 in relation to other elements, including the shoulder position 306 and a reference plane 316. In relation to FIG. 3B, the character animation system 102 defines the reference plane 316 based on a torso of an animated character (e.g., the torso is aligned vertically, which provides a reference plane for the shoulder angle). In other embodiments, the character animation system 102 defines the reference plane 316 relative to an alternative source, such as a neck or head of an animated character or a vertical or horizontal plane within a frame.

As mentioned above, the character animation system 102 can determine the blending region 322 based on a shoulder angle limit and transition angles. Specifically, in relation to FIG. 3B, the character animation system 102 determines the center of the blending region 322 utilizing a shoulder angle limit 318 originating from the shoulder position 306 and relative to the reference plane 316. Moreover, the character animation system 102 determines the boundaries of the blending region 322 based on a first transition angle 320a and a second transition angle 320b. Specifically, the character animation system 102 appends the first transition angle 320a below the shoulder angle limit 318 and appends the second transition angle 320b above the shoulder angle limit 318 to define the blending region 322. As shown, this results in a blending region 322 comprising a range of angles defined by the shoulder angle limit 318 and the transition angles 320a, 320b and surrounded by a first non-blending region 325 and a second non-blending region 326.

As mentioned above, the character animation system 102 can determine a bending direction utilizing the shoulder angle limit. For example, when a shoulder angle falls above the shoulder angle limit 318, the character animation system 102 can select/emphasize an IK solution that results in an upward/outward bending direction (e.g., the elbow bending away from the torso). Similarly, when a shoulder angle falls below the shoulder angle limit 318, the character animation system 102 can select/emphasize an IK solution that results in a downward/inward bending direction (e.g., the elbow bending toward the torso).

In addition, the character animation system 102 can blend IK solutions based on the shoulder angle limit. As described in greater detail below, the character animation system 102 blends IK solutions when a shoulder angle falls within the blending region 322. Moreover, the character animation system 102 emphasizes and/or weights IK solutions based on the position of the shoulder angle within the blending region. Moreover, in some embodiments the character animation system 102 does not blend IK solutions when a shoulder angle falls within the first non-blending region 325 or the second non-blending region 326. Rather, in these regions the character animation system 102 selects an IK solution with an appropriate bending direction based on the current shoulder angle relative to shoulder angle limit.

In some embodiments, the character animation system 102 generates a blending region 322 with a different or modified size than illustrated in FIG. 3B. For example, the character animation system 102 can alter the first transition angle 320a and/or the second transition angle 320b to be bigger angles or smaller angles, thereby changing the blending region 322 and where the character animation system 102 blends IK solutions. For instance, as the blending region 322 decreases in size, the character animation system 102 may transition between IK solutions more abruptly, such that character animation system 102 blends or transitions through a smaller area when a shoulder angle moves through the blending region 322. Additionally or alternatively, as the blending region 322 increases in size, the character animation system 102 may transition between IK solutions more gradually such that the character animation system 102 blends or transitions through a larger area as a shoulder angle moves through the blending region 322.

Further, in some embodiments, the character animation system 102 generates the shoulder angle limit 318 with a different or modified size relative to the reference plane 316 than illustrated in FIG. 3B. For example, the character animation system 102 can alter the shoulder angle limit 318 to a bigger angle or a smaller angle, thereby changing where the shoulder angle falls within the blending region 322 and where the character animation system 102 blends IK solutions. For instance, as the shoulder angle limit 318 decreases, the character animation system 102 may blend IK solutions at lower shoulder angles (e.g., at more acute shoulder angles relative to the reference plane 316). Additionally or alternatively, as the shoulder angle limit 318 increases, the character animation system 102 may blend IK solutions at higher shoulder angles (e.g., at more obtuse shoulder angles relative to the reference plane 316).

In some embodiments, the character animation system 102 includes more than one shoulder angle limit 318. For example, to simulate an animated character rotating through the elbow joint when an animated character moves an arm above the head, the character animation system 102 can utilize a second shoulder angle limit. Thus, though FIG. 3B illustrates a single shoulder angle limit 318, the character animation system 102 may include additional shoulder angle limits to achieve a more fine-grained, character-specific tuning of arm.

The character animation system 102 can determine the blending region 322, the shoulder angle limit 318, the first transition angle 320a, and/or the second transition angle 320b based on a variety of factors. For example, in some circumstances, the character animation system 102 automatically determines the blending region 322, the shoulder angle limit 318, the first transition angle 320a, and/or the second transition angle 320b based on prior digital animations (e.g., by analyzing how historical animations transitioned from an upward bending angle to a lower bending angle). In some embodiments, the character animation system 102 determines the blending region 322, the shoulder angle limit 318, the first transition angle 320a, and/or the second transition angle 320b based on user input. For example, the character animation system 102 can provide user interface elements for selection and modification of the blending region 322, the shoulder angle limit 318, the first transition angle 320a, and/or the second transition angle 320b. In some embodiments, the character animation system 102 utilizes pre-defined values, historical selections, and/or characteristics of an animated character (e.g., character dimensions, height, width, or arm length) to determine the blending region 322, the shoulder angle limit 318, the first transition angle 320a, and/or the second transition angle 320b.

In some embodiments, the first transition angle 320a and the second transition angle 320b are the same. In other embodiments, the first transition angle 320a and the second transition angle are different. Regardless, as used herein, transition angle can refer to a range of angles defining a blending region (e.g., the range of angles within a blending region). For example, the transition angle(s) can define a range of angles between a first angle (e.g., a first angle defining the start of the blending region) and a second angle (e.g., a second angle defining the end of the blending region).

As discussed above, the character animation system 102 can blend IK solutions when a shoulder angle falls within the blending region 322. For example, FIGS. 3C-3G, illustrate the character animation system 102 generating different frames of a digital animation based on different shoulder angles and a blending region in accordance with one or more embodiments. Specifically, in relation to FIGS. 3C-3G, the character animation system 102 generates a digital animation where a shoulder angle begins outside a blending region and moves through the blending region. In particular, the character animation system 102 generates an elbow position using a first bending direction and first IK solution (when the shoulder angle falls outside the blending region), blends IK solutions within the bending region, and then transitions to a second bending direction and second IK solution after moving through the blending region.

Figure 3C:
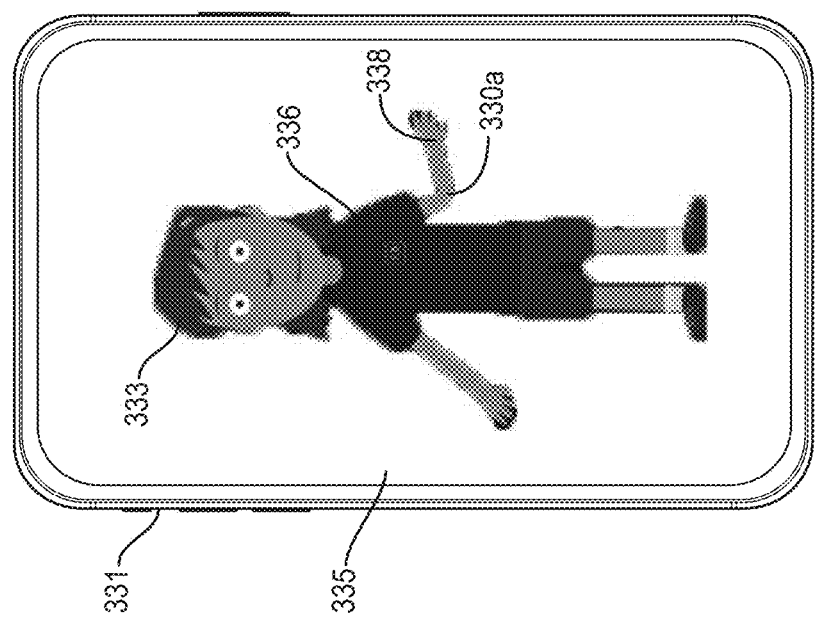
FIGS. 3C-3G illustrate schematic diagrams of generating representations of an animated character as a shoulder angle progresses through a blending region in accordance with one or more embodiments.
Figure 3C:
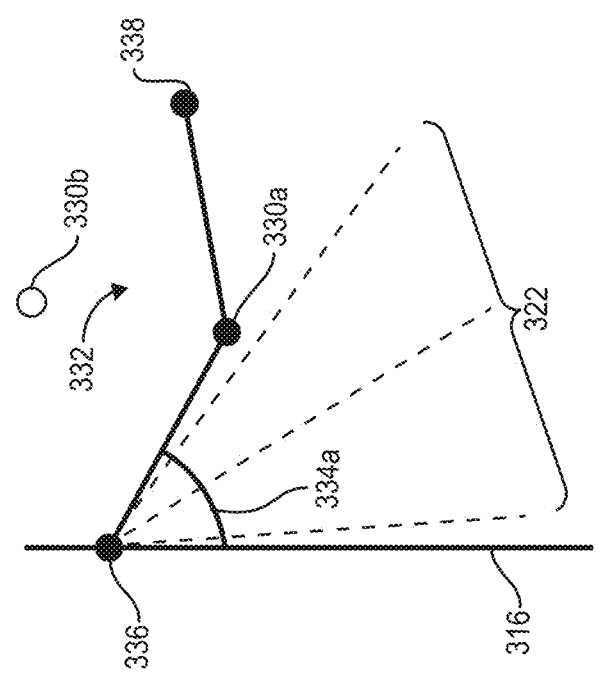

For example, FIG. 3C illustrates a computing device 331 displaying a representation of an animated character 333 in a first frame 335 of a digital animation. As shown, for the first frame 335, the character animation system 102 receives user input indicating a shoulder position 336 for a shoulder of the animated character 333 and indicating a wrist position 338 for a wrist of the animated character 333. In response, the character animation system 102 determines one or more IK solutions corresponding to the shoulder position 336 and the wrist position 338. Specifically, in relation to FIG. 3C, the character animation system 102 determines a first IK solution 332 corresponding to a first elbow position 330a and a first shoulder angle 334a. Moreover, the character animation system 102 determines a second IK solution corresponding to a second elbow position 330b.

As shown, the first shoulder angle 334a does not fall within the blending region 322. Moreover, the first shoulder angle 334a falls above the shoulder angle limit 318. Therefore, the character animation system 102 does not blend the first elbow position 330a and the second elbow position 330b. Rather, as shown in FIG. 3C, because the first shoulder angle 334a is above the shoulder angle limit 318, the character animation system 102 selects the first IK solution 332 (corresponding to an upward/outward bending direction) and the first elbow position 330a.

Upon determining the shoulder angle 330a and the first elbow position 330a, the character animation system 102 can generate the representation of the animated character 333. In particular, the character animation system 102 generates and provides the representation of the animated character 333 for display with a shoulder located in the shoulder position 336, an elbow in the first elbow position 330a, and a wrist in the wrist position 338.

Figure 3D:
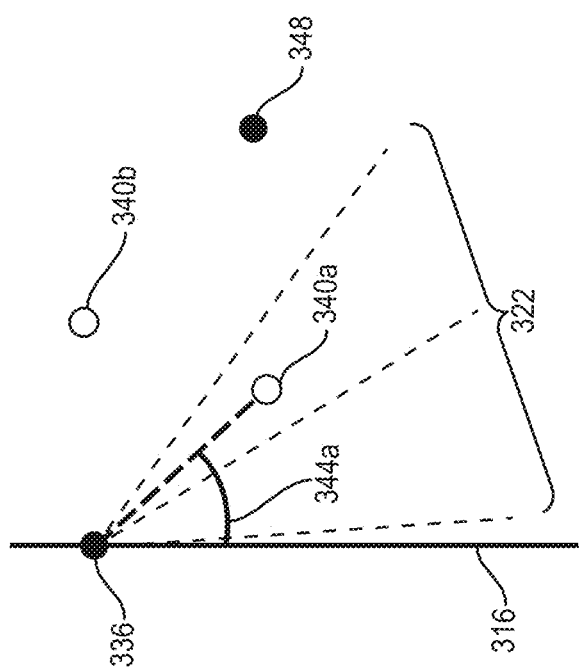

As mentioned above, the character animation system 102 can detect movement of a shoulder angle into a blending region and generate a representation of an animated character reflecting a blended elbow position. As shown in FIG. 3D, the character animation system 102 receives additional user input moving the wrist position 338 to a wrist position 348. In response, the character animation system 102 determines a first IK solution corresponding to a first elbow position 340a and a first shoulder angle 344a. Moreover, the character animation system 102 determines a second IK solution corresponding to a second elbow position 340b.

Figure 3E:
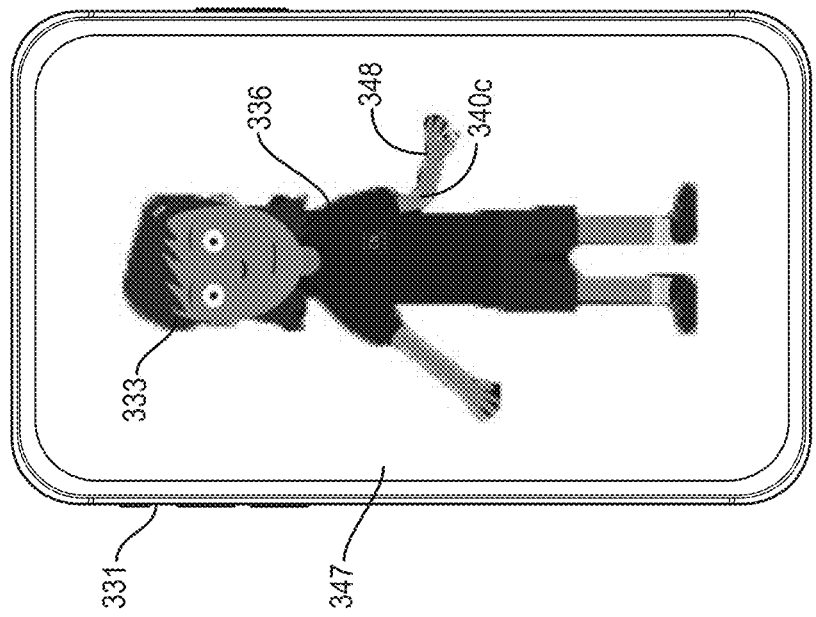
Figure 3E:
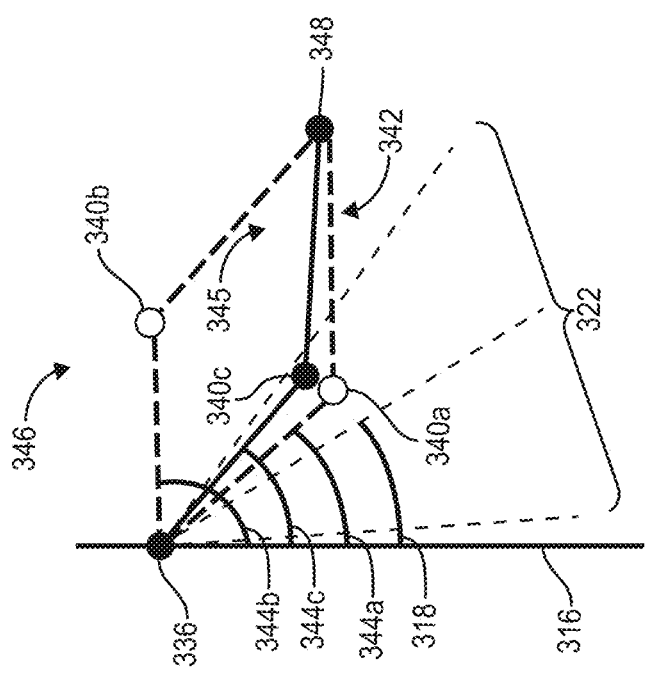

As illustrated in FIG. 3D, the first shoulder angle 344a falls within the blending region 322. In response to determining that the first shoulder angle 344a falls within the blending region 322, the character animation system 102 blends the first elbow position 340a and the second elbow position 340b. For instance, FIG. 3E illustrates the character animation system 102 generating a blended IK solution 345 including a modified elbow position 340c positioned between the first elbow position 340a and the second elbow position 340b. As shown, the blended IK solution 345 includes the shoulder position 336, the modified elbow position 340c, and the wrist position 348, which forms a modified shoulder angle 344c.

The character animation system 102 can blend two IK solutions in a variety of ways. For example, in some embodiments, the character animation system 102 blends elbow positions by starting from a first elbow position (of a first IK solution) and adding a weighted amount of the distance between the first elbow position and the second elbow positions. Similarly, in some embodiments, the character animation system 102 blends elbow positions by taking a weighted average of the two elbow positions. The character animation system 102 can combine two elbow positions utilizing various different approaches.

As just mentioned, the character animation system 102 can weight two IK solutions. For example, in some embodiments, the character animation system 102 weights two IK solutions based on where a shoulder angle falls relative to the blending region (e.g., relative to the first transition angle 320a, the second transition angle 320b, and/or the shoulder angle limit 318 of FIG. 3B). To illustrate, in some embodiments the character animation system 102 blends IK solutions using a smoothstep function based on the shoulder angle relative to the blending region. In particular, the character animation system 102 can provide a first transition (start) angle and a second transition (stop) angle of a blending region together with the shoulder angle to a smooth step function. As discussed above, the smoothstep function can analyze the shoulder angle relative to the start angle and stop angle of the blending region and generate a blending weight between 0 and 1. Accordingly, the character animation system 102 can utilize the smoothstep function to smoothly vary the blending weight between IK solutions as the shoulder angle varies within the blending region.

In relation to FIG. 3E, the character animation system 102 utilizes this smoothstep approach. For instance, FIG. 3E shows the modified elbow position 310c closer to the first elbow position 340a than the second elbow position 340b. In relation to FIG. 3E, because the first shoulder angle 344a exceeds the shoulder angle limit 318, the character animation system 102 emphasizes the first elbow position 340a (e.g., a first IK solution 342 corresponding to an upward/outward bending direction) more heavily than the second elbow position 340b (e.g., a second IK solution 346 corresponding to a downward/inward bending direction). Specifically, because the first shoulder angle 344a falls less than half-way through the blending region 322, the character animation system 102 weights the first IK solution 342 more heavily than the second IK solution 346 in generating the blended IK solution 345.

In some embodiments, when the first shoulder angle is the same as the shoulder angle limit 318, the character animation system 102 generates a blended IK solution by equally blending between the first IK solution and the second IK solution. Additionally or alternatively, when a first shoulder angle is positioned below the shoulder angle limit 318, the character animation system 102 generates a blended IK solution positioned closer to the second IK solution than the first IK solution. In this manner, the character animation system 102 weights the blending of the first IK solution and the second IK solution based on positioning of the first shoulder angle within the blending region 322.

Similarly, FIG. 3E shows that the modified shoulder angle 344c is larger (relative to the reference plane 316) than the first shoulder angle 344a for the first IK solution 342, yet smaller than the second shoulder angle 344b for the second IK solution 346. In particular, because the first shoulder angle 344a is positioned less than half-way through the blending region 322, the character animation system 102 generates the modified shoulder angle 344c closer (angle-wise) to the first shoulder angle 344a than the second shoulder angle 344b. In some embodiments, when the first shoulder angle is the same as the shoulder angle limit 318, the character animation system 102 generates the modified shoulder angle approximately equi-distant to the first shoulder angle and the second shoulder angle.

As discussed above, in blending IK solutions, the character animation system 102 can dynamically modify arm length to synthesize the appearance of three-dimensional rotation through the elbow joint. For example, FIG. 3E shows that the blended IK solution 345 has a shorter arm length (e.g., distance along the arm from the shoulder position 336, to the modified elbow position 340c, and to the wrist position 348) than both of the first IK solution 342 and the second IK solution 346. That is, by positionally constraining the shoulder position 336 and the wrist position 348, and by constraining lengthwise a potential upper arm and a potential forearm, the character animation system 102 generates the first IK solution 342 and the second IK solution 346 with equal arm lengths. By blending the first IK solution 342 and the second IK solution 346 to generate the modified elbow position 340c, the character animation system 102 shortens forearm length and/or the upper arm length. Indeed, the distance from the shoulder position 336 to the modified elbow position 340c (and/or the distance from the modified elbow position 340c to the wrist position 348) is shorter than the distance from the shoulder position 336 to the second elbow position 340b (and/or the distance from the second elbow position 340b to the wrist position 348).

Further, upon determining the modified elbow position 340c, the character animation system 102 can generate a representation of the animated character 333 in a pose corresponding to the modified elbow position 340c. For example, FIG. 3E illustrates the computing device 331 portraying the animated character 333 in a subsequent frame 347 of a digital animation. In particular, the subsequent frame 347 shows the animated character 333 with an arm configuration that depicts the blended IK solution 345. As shown, the character animation system 102 generates the animated character 333 with the shoulder position 336, the modified elbow position 340c, and the wrist position 348.

As discussed above, as a shoulder angle moves through a blending region the character animation system 102 can dynamically blend IK solutions using different weights to smoothly transition from one bending direction to another. For instance, FIG. 3F illustrates the character animation system 102 generating a blended IK solution 355 (i.e., an IK solution with a different bending direction than FIG. 3E).

Figure 3F:
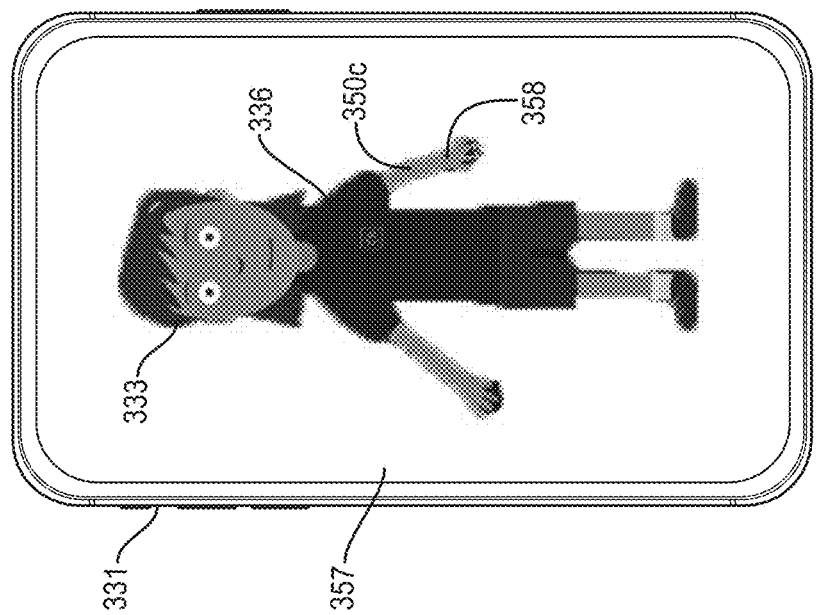
Figure 3F:
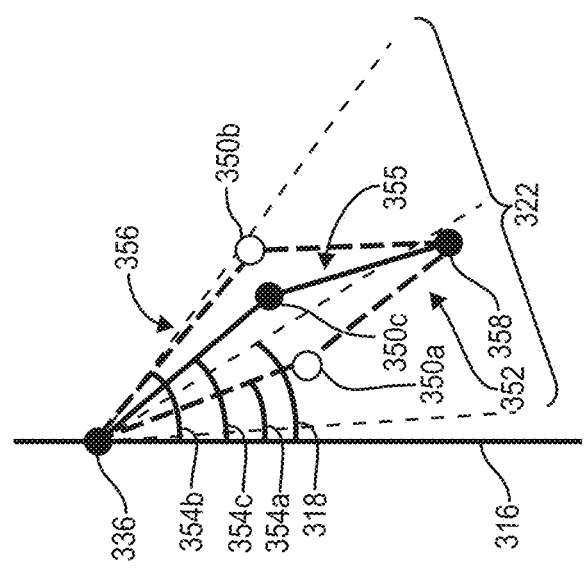

Specifically, in relation to FIG. 3F, the character animation system 102 identifies user input of a new wrist position 358 (while leaving the shoulder position 336 in place). In response, the character animation system 102 determines a first IK solution 352 having a first elbow position 350a and a first shoulder angle 354a. Moreover, the character animation system 102 determines a second IK solution 356 having a second elbow position 350b. FIG. 3F illustrates that the first shoulder angle 354a now falls below the shoulder angle limit 318. Accordingly, the character animation system 102 generates an arm with a bending direction opposite to the bending direction illustrated in FIG. 3E.

Specifically, FIG. 3F illustrates the character animation system 102 blending the first IK solution 352 and the second IK solution 356 to generate a modified elbow position 350c. Because first shoulder angle 354a falls below the shoulder angle limit 318, the character animation system 102 weights the second IK solution 356 more heavily than the first IK solution 352. Specifically, based on where the first shoulder angle 354a falls within the blending region 322 (e.g., relative to the shoulder angle limit, a first start angle, and/or a second stop angle), the character animation system 102 identifies the modified elbow position 350c by blending the first elbow position 350a and the second elbow position 350b while placing greater emphasis on the second elbow position 350b.

Similarly, FIG. 3F illustrates that the first shoulder angle 354a is positioned more than half-way through the blending region 322. Therefore, the character animation system 102 generates the modified shoulder angle 354c closer (angle-wise) to the second shoulder angle 354b than the first shoulder angle 354a. In this manner, the character animation system 102 modifies shoulder angles of the animated character within the blending region 322 by blending the first IK solution 352 and the second IK solution 354. Specifically, the character animation system 102 weights the blending of the first IK solution 352 and the second IK solution 354 based on where the first shoulder angle 354a falls within the blending region 322.

Further, FIG. 3F (like FIG. 3E) shows that the blended IK solution 356 has a shorter arm length than the first IK solution 352 and the second IK solution 354. That is, by blending the first IK solution 352 and the second IK solution 354, the character animation system 102 generates the modified elbow position 350c such that a distance between the shoulder position 336 and the modified elbow position 350c is less than a distance from the shoulder position 336 to the first elbow position 350a or the second elbow position 350b. Similarly, by blending the first IK solution 352 and the second IK solution 356, the character animation system 102 generates the modified elbow position 350c such that a distance between the wrist position 358 and the modified elbow position 350c is less than a distance from the wrist position 358 to the first elbow position 350a or the second elbow position 350b.

Upon determining the modified elbow position 350c, the character animation system 102 generates and provides for display a representation of the animated character 333 in a new pose. For example, FIG. 3F shows the computing device 331 displaying an additional frame 357 of a digital animation. As shown, the character animation system 102 generates the frame 357 with the animated character 333 based on the shoulder position 336, the modified elbow position 350c, and the wrist position 358.

As discussed above, the character animation system 102 can blend IK solutions when a shoulder angle falls within a blending region, but can cease blending when a shoulder angle falls outside a blending region. For example, FIG. 3G illustrates the character animation system 102 generating an animated character after a shoulder angle has moved outside a blending region in accordance with one or more embodiments.

Figure 3G:
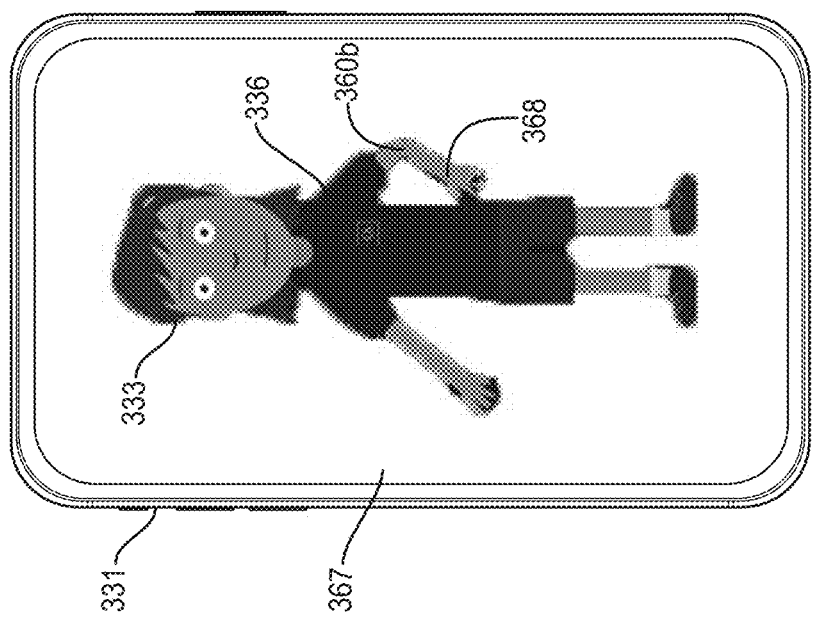
Figure 3G:
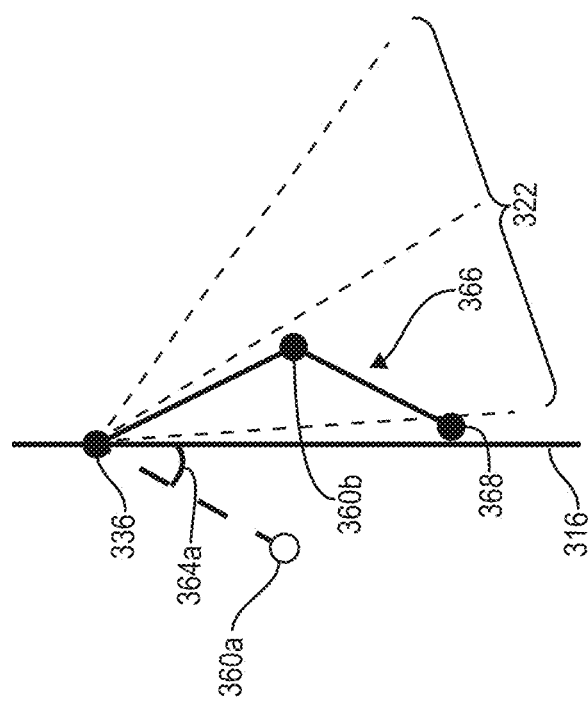

Specifically, in relation to FIG. 3G, the character animation system 102 identifies user input of a wrist position 368 (without modification to the shoulder position 336). In response, the character animation system 102 determines a first IK solution having a first elbow position 360a and first shoulder angle 364a. In addition, the character animation system 102 determines a second IK solution 366 having a second elbow position 360b. As illustrated, the character animation system 102 determines that the first shoulder angle 364a is below the shoulder angle limit 318 and falls outside the blending region 322.

Because the first shoulder angle 364a falls outside the blending region 322, the character animation system 102 does not blend IK solutions. Moreover, because the first shoulder angle falls below the shoulder angle limit 318, the character animation system 102 utilizes the second IK solution 366 having the second elbow position 360b (corresponding to an inward/downward direction). Accordingly, as shown in FIG. 3G, the character animation system 102 utilizes the (unblended) second IK solution 366, which proceeds from the shoulder position 336, to the second elbow position 360b, and to the wrist position 368.

Further, as illustrated in FIG. 3G, the character animation system 102 generates (and provides for display) the animated character 333 based on the wrist position 368. In particular, FIG. 3 illustrates the computing device 331 displaying a further frame 367 of a digital animation that includes the animated character 333 in a modified pose. As shown, the character animation system 102 generates the animated character 333 utilizing the shoulder position 336, the second elbow position 360b of the second IK solution 366, and the wrist position 368.

In sum, FIGS. 3C-3G illustrate multiple frames of an animated sequence generated by the character animation system 102 as part of an animation sequence. Specifically, the frames illustrate a representation of an animated character in different poses in response to user modification of a wrist position of the animated character 333. By determining different shoulder angles in relation to the blending region 322 and the shoulder angle limit 318, the character animation system 102 generates animated characters with realistic bending directions and smooth, natural transitions as part of an overarching animation sequence.

Although FIGS. 3C-3G illustrate a specific sequence of arm configurations, the character animation system 102 can generate a variety of different configurations in different sequences. For example, a shoulder angle of an animated character may proceed through the blending region 322 in an upward motion (e.g., opposite the downward motion depicted in FIGS. 3C-3G) or in a variety of different combinations of motion sequences (e.g., in an upward motion followed by a downward motion.

In addition, although FIGS. 3C-3G illustrate utilizing a particular shoulder angle (e.g., a first shoulder angle corresponding to a first IK solution) in relation to the blending region 322, the character animation system 102 can utilize a variety of alternative shoulder angles. For example, rather than utilizing the first shoulder angle 354a to determine if a shoulder angle of the animated character falls within the blending region 322 (or falls above or below the shoulder angle limit 318), in some embodiments, the character animation system 102 utilizes the second shoulder angle (e.g., the second shoulder angle 344b or 354b) to determine if a shoulder angle of the animated character falls within the blending region 322 (or falls above or below the shoulder angle limit 318). In some embodiments, the character animation system 102 utilizes both the first shoulder angle and the second shoulder angle to determine if a shoulder angle falls within the blending region 322 (e.g., blend IK solutions if either or both of the first shoulder angle 354a and the second shoulder angle 354b fall within the blending region 322).

In addition to the algorithms and acts described above, the character animation system 102 can also be described in terms of pseudocode implemented by a computing device (e.g., the server(s) 104, the client device 108, and/or the computing device 331). For example, given a wristPos (user-animated 2D position such as the wrist position 358), shoulderPos (2D position such as the shoulder position 336), angleLimit (user parameter to control when to transition to alternate IK solutions, such as the shoulder angle limit 318), transitionAngle (user parameter to control smoothness of transition, such as the transition angles 320a, 320b of FIG. 3B) the character animation system 102 can compute elbowPosFinal (2D position such as modified elbow position 350c) for natural arm bend using the following example pseudocode implemented by a computing device:

elbowPos1,elbowPos2=twoLinkIK(shoulderPos,wristPos)

upArmVec=elbowPos1−shoulderPos shoulderAngle=$a\tan 2$(upArmVec[1],upArmVec[0])

blendWeight=smoothstep(angleLimit−transitionAngle,angleLimit+transitionAngle,shoulderAngle)

elbowPosFinal=blendWeight*(elbowPos2−elbowPos1)+elbowPos1, where twoLinkIK( ) is an inverse kinematic algorithm (as described above), elbowPos1 is a first elbow position of a first IK solution (e.g., first elbow position 350a), elbowPos2 is a second elbow position of a second IK solution (e.g., second elbow position 350b), upArmVec is a vector representation of an upper arm, shoulderAngle is a shoulder angle (e.g., the first shoulder angle 354a), blendweight is a blending weight between elbowPos1 and elbowPos2, and positions/angles are relative to a local reference plane (e.g., relative to the torso of the animated character as opposed to world coordinates).

Although FIGS. 3C-3G illustrate a single shoulder angle limit, as mentioned above, the character animation system 102 can utilize multiple shoulder angle limits. For instance, to maintain continuity when an arm is in an upward position, the character animation system 102 can include a first shoulder angle limit (as illustrated in FIGS. 3C-3G in a lower semi-circle relative to an animated character) and a second shoulder angle limit (in an upper semi-circle relative to the animated character).

For instance, the character animation system may impose a first shoulder angle limit for a first region and a second shoulder angle limit for a second region (e.g., for a first region comprising an angle range from zero to one hundred eighty degrees relative to the reference plane 316 and a second region comprising an angle range from one hundred eighty degrees to three hundred sixty degrees relative to the reference plane 316). Similarly, in some embodiments the character animation system 102 includes a first shoulder angle limit (e.g., the shoulder angle limit 318) and a second shoulder angle limit extending from the shoulder position 306 in the opposite direction of the first shoulder angle limit such that the first shoulder angle limit and the second shoulder angle limit form a line.

In some embodiments, the character animation system 102 can set the first shoulder angle limit (and corresponding transition angles) independently of a second should angle limit (and corresponding transition angles). For instance, the character animation system 102 can provide selectable elements via a user interface for modifying a first shoulder angle limit, a first corresponding transition angle, a second shoulder angle limit, and a second corresponding transition angle. In some embodiments, the shoulder angle limits and the transition angles are predetermined. In one or more embodiments, the shoulder angle limits and the transition angles are automatically determined based on the animated character, user history, or other factors.

In sum, the character animation system 102 may impose a variety of shoulder angle limits to create continuity, realism, and/or character-specific arm movement as an animated character rotates through a full 360 degree range of motion of the shoulder joint and rotates the elbow joint and bend direction of the arm in response.

Figure 4:
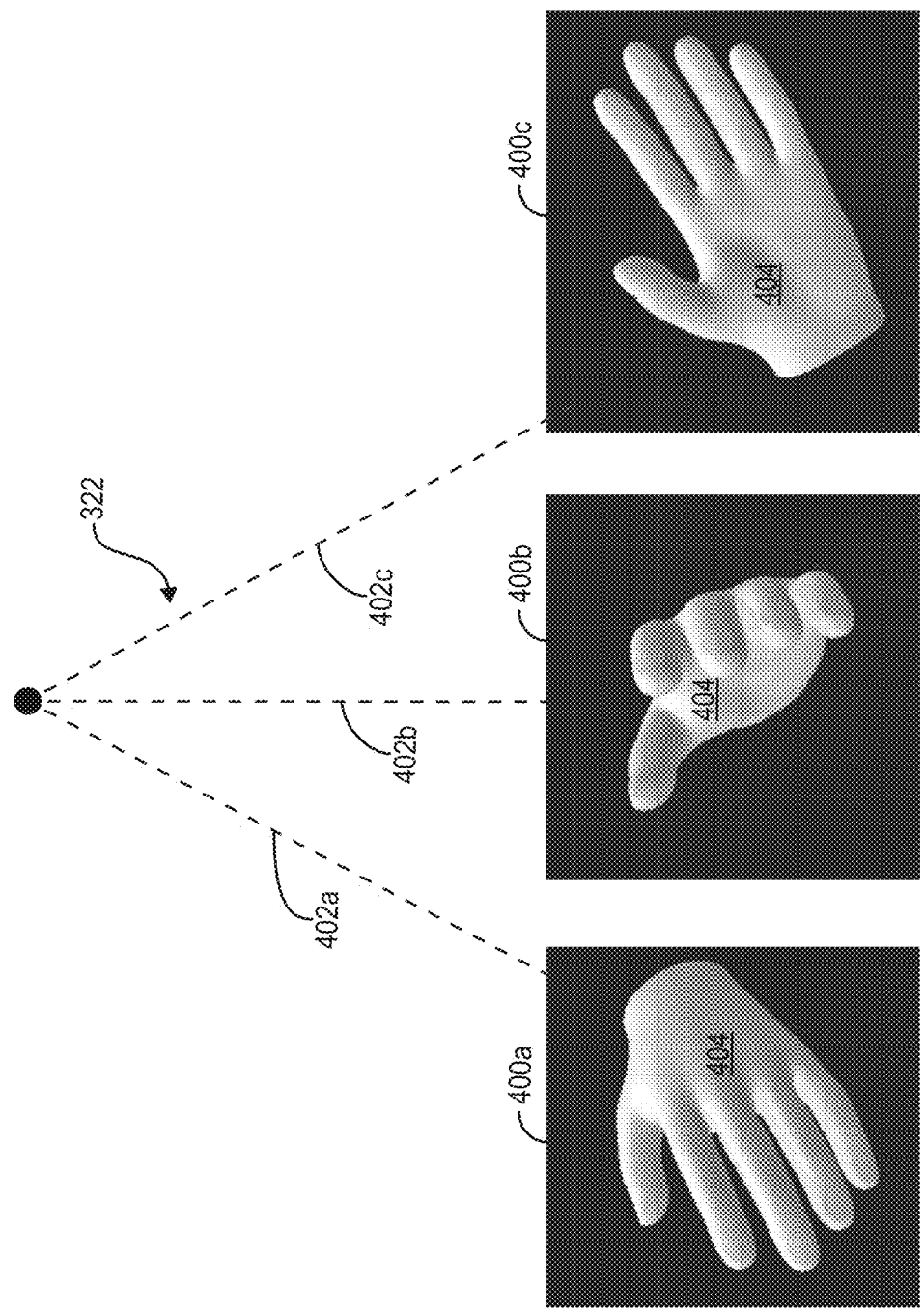
FIG. 4 illustrates a schematic of example art layers associated with various orientations of an arm of an animated character in accordance with one or more embodiments.

As mentioned above, the character animation system 102 can switch between art layers as a shoulder angle of the animated character moves through a blending region. For instance, FIG. 4 illustrates the character animation system 102 utilizing art layers 400a-400c through the blending region 322 in accordance with one or more embodiments. Specifically, FIG. 4 shows three example switch points 402a-402c of the blending region 322 that correspond to respective art layers 400a-400c depicting an example hand 404 in various example orientations.

As shown in FIG. 4, the character animation system 102 switches between art layers 400a-400c at distinct switch points 402a-402c of the blending region 322. However, in accordance with one or more embodiments of the present disclosure, the character animation system 102 may implement more or fewer art layers and/or switch points than are expressly illustrated in FIG. 4. For example, in some embodiments, the character animation system 102 cycles through a series of art layers each respectively associated with distinct arm orientations of the animated character. As a shoulder angle of the animated character passes through the blending region 322, the shoulder angle may satisfy one or more of the switch points that correspond to an art layer in the series of art layers. Further, as the number of art layers increases, the character animation system 102 may create a more realistic movement effect, including a three-dimensional arm motion effect.

In some embodiments, the character animation system 102 depicts other graphics, objects, and/or portions of an animated character arm in one or more of the art layers 400a-400c. For example, the first art layer 400a may depict a forearm, the second art layer 400b may depict a sidearm, and the third art layer 400c may depict an underarm. In another example, the first art layer 400a may depict a first portion of a tattoo on the animated character arm, the second art layer 400b may depict a second portion of the tattoo on the animated character arm, and the third art layer 400c may depict a third portion of the tattoo on the animated character arm. In this manner, the character animation system 102 may simulate a rolling or twisting of the arm as the bending direction of the arm changes, e.g., within the blending region 322.

Figure 5:
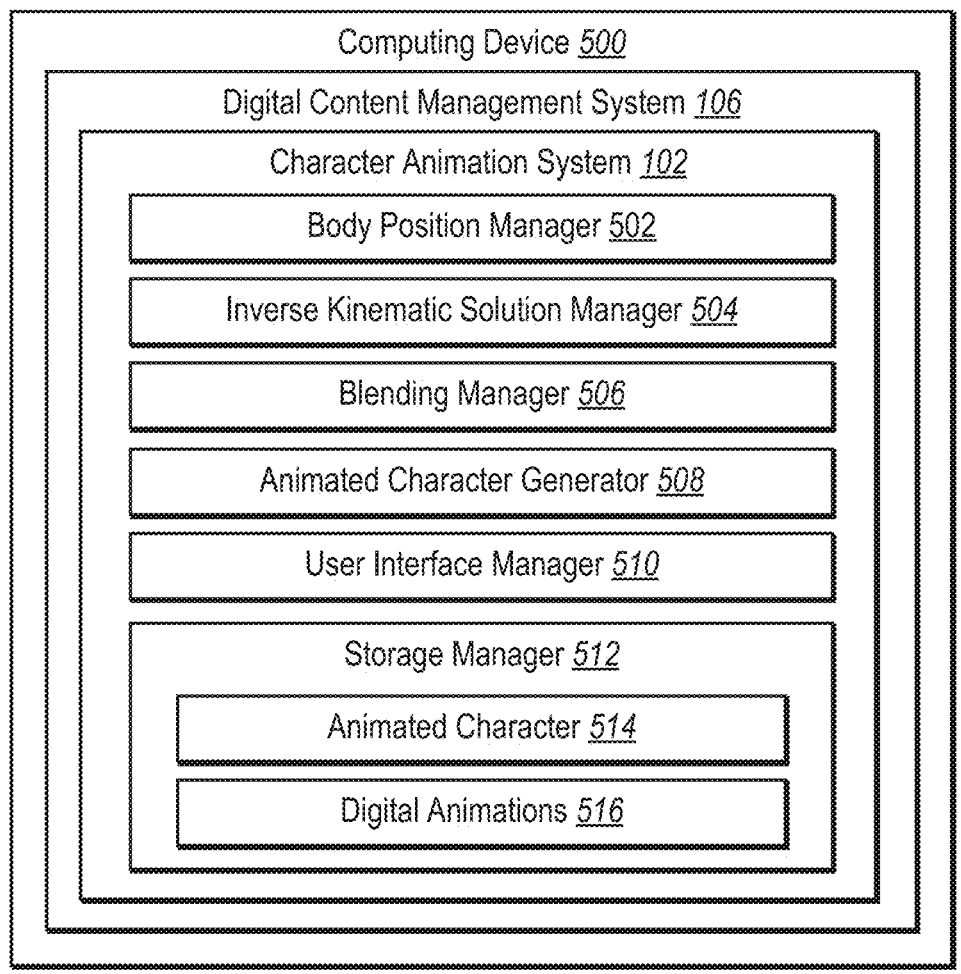
FIG. 5 illustrates a schematic diagram of a character animation system in accordance with one or more embodiments.

Turning now to FIG. 5, additional detail is provided regarding components and capabilities of the character animation system 102 in accordance with one or more embodiments. As shown, the character animation system 102 is implemented by the computing device 500, including the digital content management system 106 of the computing device 500. In other embodiments, the components of the character animation system 102 can be implemented by a single device (e.g., the server(s) 104 and/or the client device 108 of FIG. 1) or other devices. As shown, the character animation system 102 includes a body position manager 502, an inverse kinematic solution manager 504, a blending manager 506, an animated character generator 508, a user interface manager 510, and a storage manager 512. Each is discussed in turn below.

The body position manager 502 can identify, determine, receive, and/or generate positions of different parts of an animated character. For example, the body position manager 502 can identify a wrist position, a shoulder position, a shoulder angle, and/or any other portions of the animated character. Additionally or alternatively, the body position manager 502 can identify one or more vectors relative to body positions.

The inverse kinematic solution manager 504 can identify, determine, and/or generate IK solutions that include elbow positions of an animated character. For example, based on the wrist position and the shoulder position identified by the body position manager 502, the inverse kinematic solution manager 504 can determine a first IK solution of a first elbow position and a second IK solution of a second elbow position. As described above, IK solutions include positional data and/or parameters for a particular joint determined using an inverse kinematic algorithm given positional data and/or parameters of other joints. More generally, inverse kinematics make use of kinematic equations to recover the movements of an object in the world from some other data. In the instant application, the inverse kinematic solution manager 504 may employ one or more types of methodologies to determine the positional data and/or the parameters for a particular joint.

The blending manager 506 can identify, determine, and/or generate a modified elbow position by blending IK solutions obtained by the inverse kinematic solution manager 504. The blending manager 506 can determine a shoulder angle (e.g., based on joint positions and IK solutions determined by the body position manager 502 and the inverse kinematic solution manager 504). Moreover, the blending manager 506 can blend IK solutions based on the shoulder angle. In particular, the blending manager 506 blends IK solutions when the shoulder angle of the animated character is within a blending region. In these or other embodiments, the blending manager 506 blends IK solutions by utilizing a smoothstep function to weight at least one of the IK solutions based on proximity of the shoulder angle relative to the shoulder angle limit within the blending region. After the blending manager 506 determines the blend weight for IK solutions, the blending manager 506 can then determine the modified elbow position, as described above.

The animated character generator 508 can generate, create, render, and/or provide for display animated characters (or representations of animated characters) as described above. In particular, the animated character generator 508 can render a representation of an animated character with a modified elbow position as determined by the blending manager 506. In rendering the animated character with the modified elbow position, the animated character generator 508 may shorten an arm length of the animated character relative to the first IK solution having a first elbow position and relative to a second IK solution having a second elbow position.

Further, in rendering the animated character with the modified elbow position, the animated character generator 508 may render art layers that are respectively associated with certain orientations of the arm of the animated character. For example, the animated character generator 508 may determine switch points at which the art layers are triggered for display as the shoulder angle of the animated character moves through the blending region.

The user interface manager 510 can provide, manage, and/or control a graphical user interface (or simply "user interface"). In particular, the user interface manager 510 may generate and display a user interface by way of a display screen composed of a plurality of graphical components, objects, and/or elements that allow a user to perform a function. For example, the user interface manager 510 can receive user inputs from a user, such as a click/drag to select a hand for moving an arm to edit a digital animation. Additionally, the user interface manager 510 can present a variety of types of information, including text, digital media items, animated characters generated by the animated character generator 508, or other information.

The storage manager 512 maintains data for the character animation system 102 at the client device 108. The storage manager 512 can maintain data of any type, size, or kind, as necessary to perform the functions of the character animation system 102, including an animated character 514 and digital animations 516.

Each of the components 502-516 of the character animation system 102 can include software, hardware, or both. For example, the components 502-516 can include one or more instructions stored on a computer-readable storage medium and executable by processors of one or more computing devices, such as a client device or server device. When executed by the one or more processors, the computer-executable instructions of the character animation system 102 can cause the computing device(s) to perform the methods described herein. Alternatively, the components 502-516 can include hardware, such as a special-purpose processing device to perform a certain function or group of functions. Alternatively, the components 502-516 of the character animation system 102 can include a combination of computer-executable instructions and hardware.

Furthermore, the components 502-516 of the character animation system 102 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 502-516 may be implemented as a stand-alone application, such as a desktop or mobile application. Furthermore, the components 502-516 may be implemented as one or more web-based applications hosted on a remote server.

The components 502-516 may also be implemented in a suite of mobile device applications or "apps." To illustrate, the components 502-516 may be implemented in an application, including but not limited to ADOBE® CREATIVE CLOUD, such as ADOBE® CHARACTER ANIMATOR, ADOBE® ANIMATE, ADOBE® PHOTOSHOP, ADOBE® LIGHTROOM, ADOBE® ILLUSTRATOR, ADOBE® INDESIGN, ADOBE® AFTER EFFECTS, or ADOBE® DREAMWEAVER. Product names, including "ADOBE" and any other portion of one or more of the foregoing product names, may include registered trademarks or trademarks of Adobe Systems Incorporated in the United States and/or other countries.

Figure 6:
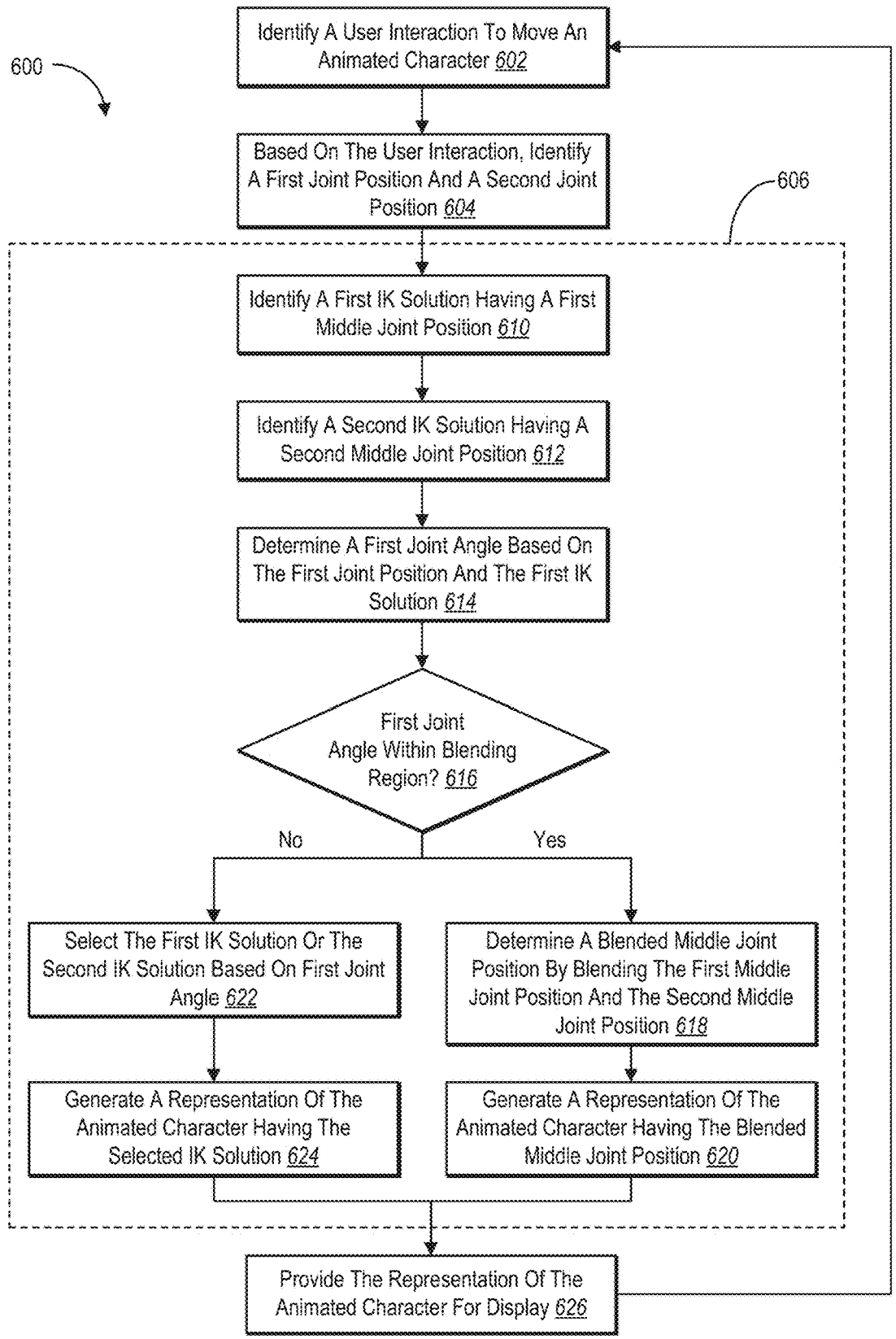
FIG. 6 illustrates a flow chart of a series of acts in a step for generating a representation of an animated character in accordance with one or more embodiments.

FIGS. 1-5, the corresponding text, and the examples provide several different systems, methods, techniques, components, and/or devices of the character animation system 102 in accordance with one or more embodiments. In addition to the above description, one or more embodiments can also be described in terms of flowcharts including acts for accomplishing a particular result. For example, FIG. 6 illustrates a flowchart of a series of acts 600, including a series of acts 610-624 in a step 606 for generating a representation of the animated character in accordance with one or more embodiments. In particular, the acts 610-624 can provide supporting acts, algorithms, and/or structure for a step for generating a representation of an animated character having a blended middle joint position reflecting both a first inverse kinematic solution of a first middle joint position and a second inverse kinematic solution of a second middle joint position in accordance with one or more embodiments. Moreover, the algorithms and acts described above (e.g., in relation to FIGS. 2-3G) can provide the corresponding structure for a step for generating a representation of an animated character having a blended middle joint position reflecting both a first inverse kinematic solution of a first middle joint position and a second inverse kinematic solution of a second middle joint position.

As illustrated in FIG. 6, the character animation system 102 performs an act 602 to identify a user interaction to move an animated character. For example, the user interaction may include a user input to move one or more portions of the animated character, such as a hand or wrist of the animated character. The character animation system 102 may identify the user interaction as described in the preceding/subsequent description and corresponding figures, for example, to identify positional movement of the animated character from an initial position.

The character animation system 102 further performs an act 604 to identify, based on the user interaction, a first joint position and a second joint position. In some embodiments, the first joint position is a wrist position. Additionally, the second joint position may include a shoulder position. Moreover, the character animation system 102 may identify the first joint position and the second joint position as described in the present disclosure, for example, in the preceding/subsequent description and corresponding figures.

The character animation system 102 further performs the step 606 for generating a representation of the animated character having a blended middle joint position reflecting both a first inverse kinematic solution of a first middle joint position and a second inverse kinematic solution of a second middle joint position. The step 606 includes an act 610 to identify a first 1K solution having a first middle joint position. In some embodiments, the first middle joint position is an elbow position (e.g., a first elbow position) that corresponds to a first bending direction of the animated character arm. For example, the character animation system 102 may identify the first middle joint position utilizing an inverse kinematic algorithm as described above (e.g., in relation to FIG. 3A).

The character animation system 102 further performs in the step 606 an act 612 to identify a second 1K solution having a second middle joint position. In some embodiments, the second middle joint position is an elbow position (e.g., a second elbow position) that corresponds to a second bending direction of the animated character arm different from the first bending direction. For example, the character animation system 102 may identify the second middle joint position as described above (e.g., in relation to FIG. 3A).

The character animation system 102 further performs in the step 606 an act 614 to determine a first joint angle based on the first joint position and the first 1K solution. In some embodiments, the first joint angle is a first shoulder angle relative to a reference plane. Moreover, the character animation system 102 may determine the first joint angle based on the first joint position and the first 1K solution as described in the present disclosure, for example, in the preceding/subsequent description and corresponding figures.

The character animation system 102 further performs in the step 606 an act 616 to query whether the first joint angle is within a blending region. In some embodiments, the first joint angle is within the blending region when the first joint angle falls between a first transition angle and a second transition angle of the blending region. For example, the character animation system 102 may determine whether the first joint angle is within the blending region as described above (e.g., in relation to FIGS. 3B-3G).

If the character animation system 102 determines that the first joint angle falls within the blending region, then the character animation system 102 further performs in the step 606 an act 618 to determine a blended middle joint position by blending the first middle joint position and the second middle joint position. In some embodiments, the blended middle joint position may include a blended elbow position. Additionally, the character animation system 102 can blend the first middle joint position and the second middle joint position by weighting the first IK solution and/or the second IK solution, e.g., according to a smoothstep function. In this manner, the character animation system 102 positions the blended middle joint spatially between the first middle joint position and the second middle joint position. For example, the character animation system 102 may determine the blended middle joint position as described above (e.g., in relation to FIGS. 3D-3F).

If the character animation system 102 determines that the first joint angle falls within the blending region, then the character animation system 102 further performs in the step 606 an act 620 to generate a representation of the animated character having the blended middle joint position. In some embodiments, the character animation system 102 generates the representation of the animated character based on the first joint position, the second joint position, and the blended middle joint position by generating a modified arm having a modified arm length different from the initial arm length (e.g., as described above in relation to FIGS. 3D-3F).

Alternatively, if the character animation system 102 determines at the act 616 that the first joint angle falls outside the blending region, then the character animation system 102 further performs in the step 606 an act 622 to select the first IK solution or the second IK solution based on the first joint angle. In some embodiments, the character animation system 102 selects the first IK solution if the first joint angle falls within a first non-blending region below the blending region, or selects the second IK solution if the first joint angle falls within a second non-blending region above the blending region. For example, the character animation system 102 may select the first IK solution or the second IK solution based on the first joint angle as described above (e.g., in relation to FIGS. 3C, 3G) in the present disclosure, for example, as described in the preceding/subsequent description and corresponding figures.

If the character animation system 102 determines at the act 616 that the first joint angle falls outside the blending region, then the character animation system 102 further performs in the step 606 an act 624 to generate a representation of the animated character having the selected IK solution. In some embodiments, generating the representation of the animated character having the selected IK solution includes generating an arm of the animated character at the shoulder position and the wrist position in act 604 and the elbow position in either act 610 or 612. Moreover, the character animation system 102 may generate a representation of the animated character having the selected IK solution as described in the present disclosure, for example, as described in the preceding/subsequent description and corresponding figures (e.g., FIGS. 3C, 3G).

After the character animation system 102 performs the step 606, the character animation system 102 performs an act 626 to provide the representation of the animated character for display. In some embodiments, the character animation system 102 provides the representation of the animated character for display by outputting the representation of the animated character to a user interface as part of a digital content editing application, such as a digital animation application.

Further illustrated in relation to the act 626, the character animation system 102 may repeat one or more acts in the series of acts 600 as shown by the arrow looping from the act 626 back to the act 602. In this manner, the character animation system 102 can dynamically respond to on-the-fly edits to an animated character in a frame of a digital animation. For example, the character animation system 102 can receive further user interactions to move the animated character (e.g., a user input dragging a hand of the animated character to a new location within the frame of the digital animation).

Figure 7:
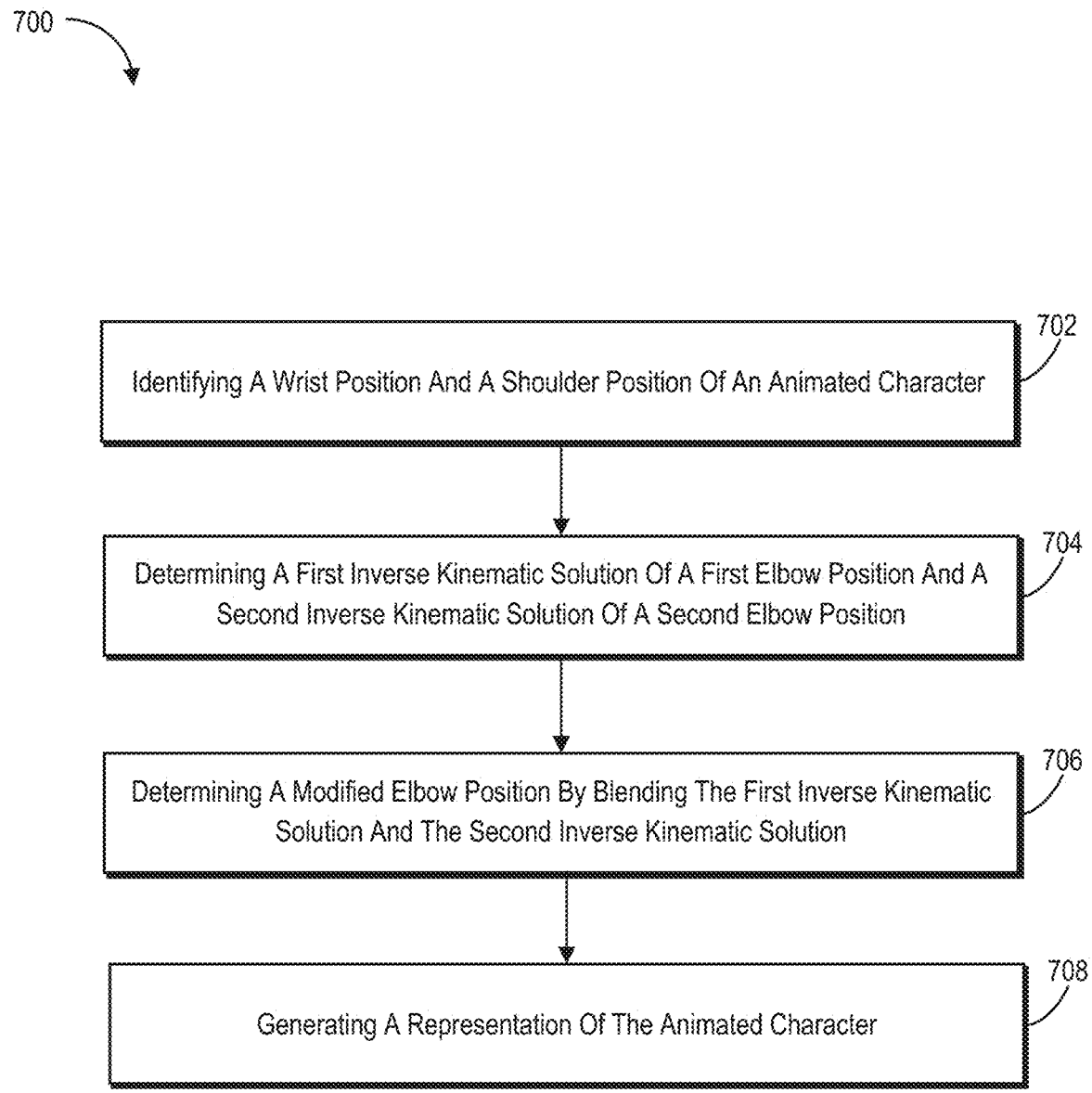
FIG. 7 illustrates a flowchart of a series of acts for blending IK solutions in accordance with one or more embodiments.

As mentioned, the character animation system 102 can determine a modified elbow position of an animated character by blending IK solutions. For example, FIG. 7 illustrates a flowchart of a series of acts 700 for determining a modified elbow position of an animated character in accordance with one or more embodiments. The character animation system 102 may perform one or more acts of the series of acts 700 in addition to or alternatively to one or more acts of the series of acts 600 of FIG. 6. While FIG. 7 illustrates acts according to one embodiment, alternative embodiments may omit, add to, reorder, and/or modify any of the acts shown in FIG. 7. The acts of FIG. 7 can be performed as part of a method. Alternatively, a non-transitory computer-readable medium can comprise instructions that, when executed by one or more processors, cause a computing device to perform the acts of FIG. 7. In some embodiments, a system can perform the acts of FIG. 7.

As shown, the series of acts 700 includes an act 702 of identifying a wrist position and a shoulder position of an animated character in a frame of a digital animation. For example, the act 702 can include identifying user input of a shoulder position and/or user input of a wrist position. In some embodiments, the act 702 includes identifying user input moving a wrist from an initial position to the wrist position.

Further, the series of acts 700 includes an act 704 of determining, based on the wrist position and the shoulder position of the animated character, a first inverse kinematic solution of a first elbow position and a second inverse kinematic solution of a second elbow position. For example, as described above, the act 704 can include utilizing an inverse kinematic algorithm to analyze the wrist position and the shoulder position to determine the first inverse kinematic solution that includes the first elbow position and the second inverse kinematic solution that includes the second elbow position.

In addition, the series of acts 700 includes an act 706 of determining, based on a shoulder angle of the animated character, a modified elbow position by blending the first inverse kinematics solution of the first elbow position and the second inverse kinematic solution of the second elbow position. Specifically, in some embodiments, the act 706 includes identifying the shoulder angle of the animated character in the frame of the two-dimensional digital animation by identifying an angle between a reference plane associated with the animated character and a line connecting the shoulder position with the first elbow position or the second elbow position.

In some embodiments, the act 706 includes determining the modified elbow position in response to determining that the shoulder angle of the animated character falls within a blending region. In these or other embodiments, the blending region comprises a range of angles between a first angle and a second angle. Thus, in some embodiments, the act 706 includes determining that the shoulder angle of the animated character falls within the blending region by determining that the shoulder angle is between the first angle and the second angle. Additionally or alternatively, the act 706 and/or a separate act includes determining the first angle and the second angle by one or more of: (i) identifying a shoulder angle limit indicating a central angle of the blending region; (ii) identifying a transition angle indicating an angle range relative to the shoulder angle limit; and/or (iii) determining the first angle and the second angle by applying the transition angle to the shoulder angle limit.

As further shown, the series of acts 700 includes an act 708 of generating a representation of the animated character based on the wrist position, the shoulder position, and the modified elbow position. Specifically, the act 708 includes generating the representation of the animated character based on the wrist position, the shoulder position, and the modified elbow position by generating a modified arm having a modified arm length shorter than an initial arm length.

It is understood that the outlined acts in the series of acts 700 are only provided as examples, and some of the acts may be optional, combined into fewer acts, or expanded into additional acts without detracting from the essence of the disclosed embodiments. As an example of an addition act not shown in FIG. 7, an act in the series of acts 700 may include blending the first inverse kinematics solution of the first elbow position and the second inverse kinematic solution of the second elbow position by weighting the first inverse kinematic solution of the first elbow position and the second inverse kinematic solution of the second elbow position based on proximity of the shoulder angle relative to the first angle and the second angle. In some embodiments, weighting the first inverse kinematics solution of the first elbow position and the second inverse kinematic solution of the second elbow position comprises applying a smoothstep function to the first inverse kinematics solution of the first elbow position and the second inverse kinematic solution of the second elbow position based on the first angle, the second angle, and the shoulder angle.

As another example act not shown in FIG. 7, an act in the series of acts 700 may include receiving a user input associated with a portion of the animated character to move at least one of the wrist position or the shoulder position to a new wrist position and a new shoulder position, respectively. Acts described above, (e.g., acts 704-706) may be repeated for the new wrist and shoulder position to determine a new wrist position, a new shoulder position, and a new modified elbow position. For example, an act in the series of acts 700 may include determining, based on the new wrist position and the new shoulder position, a third inverse kinematic solution of a third elbow position and a fourth inverse kinematic solution of a fourth elbow position. In yet another example, an act in the series of acts 700 may include determining, based on a new shoulder angle of the animated character, a new modified elbow position by blending the third inverse kinematics solution of the third elbow position and the fourth inverse kinematic solution of the fourth elbow position. Additionally or alternatively, another act in the series of acts 700 may include generating an additional representation of the animated character based on the new wrist position, the new shoulder position, and the new modified elbow position.

As another example act not shown in FIG. 7, an act in the series of acts 700 may include associating a first art layer with a first orientation of an arm of the animated character and associating a second art layer with a second orientation of the arm of the animated character. Additionally or alternatively, an act in the series of acts 700 may include determining a switch point within a blending region at which a shoulder angle of the animated character triggers a switch between the first art layer and the second art layer. Another act in the series of acts 700 may then include generating for display the first art layer or the second art layer by comparing the shoulder angle and the switch point.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 8:
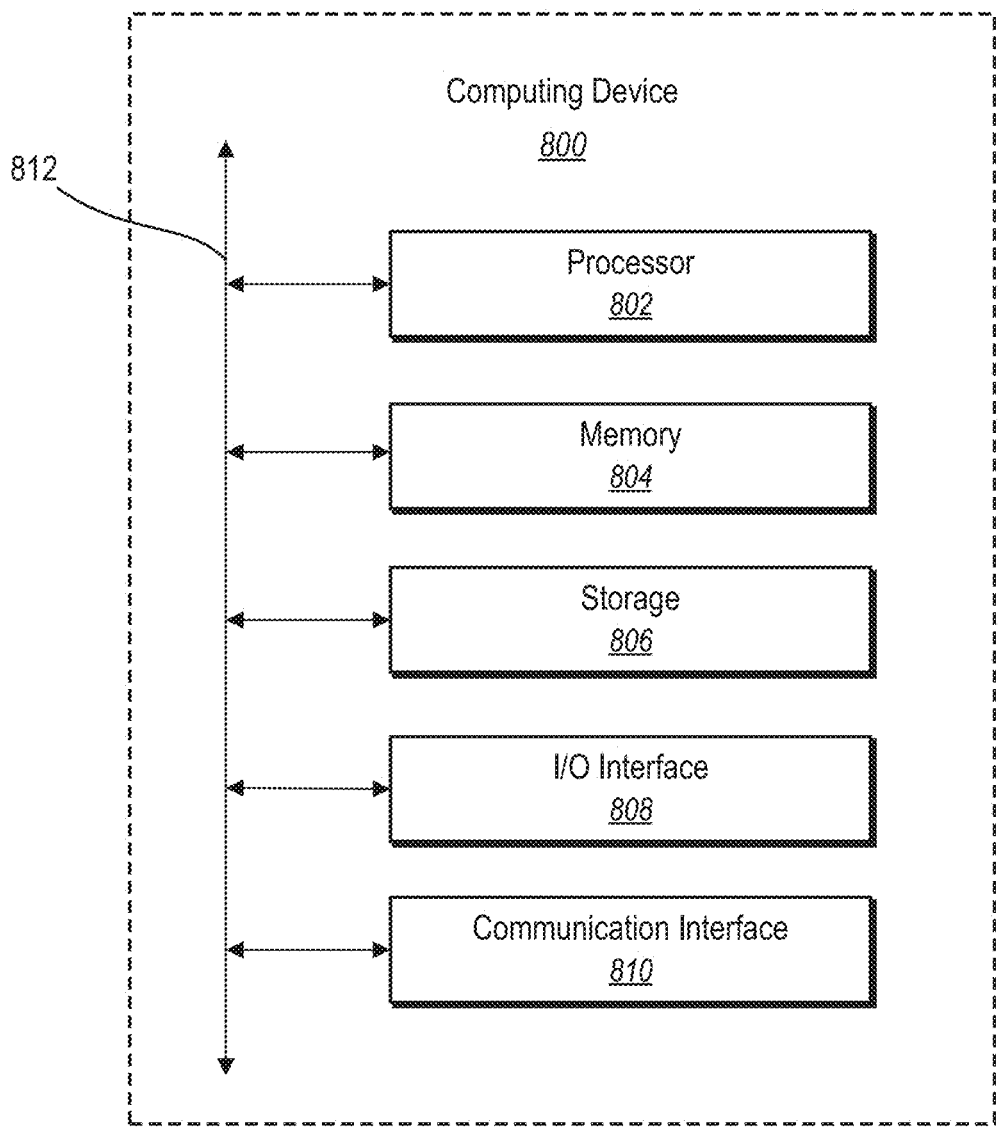
FIG. 8 illustrates a block diagram of an example computing device for implementing one or more embodiments of the present disclosure.

FIG. 8 illustrates a block diagram of an example computing device 800 that may be configured to perform one or more of the processes described above. One will appreciate that one or more computing devices, such as the computing device 800 may represent the computing devices described above (e.g., the computing device 500, the server(s) 104, and the client device 108). In one or more embodiments, the computing device 800 may be a mobile device (e.g., a mobile telephone, a smartphone, a PDA, a tablet, a laptop, a camera, a tracker, a watch, a wearable device, etc.). In some embodiments, the computing device 800 may be a non-mobile device (e.g., a desktop computer or another type of client device). Further, the computing device 800 may be a server device that includes cloud-based processing and storage capabilities.

As shown in FIG. 8, the computing device 800 can include one or more processor(s) 802, memory 804, a storage device 806, input/output interfaces 808 (or "I/O interfaces 808"), and a communication interface 810, which may be communicatively coupled by way of a communication infrastructure (e.g., bus 812). While the computing device 800 is shown in FIG. 8, the components illustrated in FIG. 8 are not intended to be limiting. Additional or alternative components may be used in other embodiments. Furthermore, in certain embodiments, the computing device 800 includes fewer components than those shown in FIG. 8. Components of the computing device 800 shown in FIG. 8 will now be described in additional detail.

In particular embodiments, the processor(s) 802 includes hardware for executing instructions, such as those making up a computer program. As an example, and not by way of limitation, to execute instructions, the processor(s) 802 may retrieve (or fetch) the instructions from an internal register, an internal cache, memory 804, or a storage device 806 and decode and execute them.

The computing device 800 includes memory 804, which is coupled to the processor(s) 802. The memory 804 may be used for storing data, metadata, and programs for execution by the processor(s). The memory 804 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 804 may be internal or distributed memory.

The computing device 800 includes a storage device 806 includes storage for storing data or instructions. As an example, and not by way of limitation, the storage device 806 can include a non-transitory storage medium described above. The storage device 806 may include a hard disk drive (HDD), flash memory, a Universal Serial Bus (USB) drive or a combination these or other storage devices.

As shown, the computing device 800 includes one or more I/O interfaces 808, which are provided to allow a user to provide input to (such as user strokes), receive output from, and otherwise transfer data to and from the computing device 800. These I/O interfaces 808 may include a mouse, keypad or a keyboard, a touch screen, camera, optical scanner, network interface, modem, other known I/O devices or a combination of such I/O interfaces 808. The touch screen may be activated with a stylus or a finger.

The I/O interfaces 808 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 808 are configured to provide graphical data to a display for presentation to a user. The graphical data may be representative of one or more graphical user interfaces and/or any other graphical content as may serve a particular implementation.

The computing device 800 can further include a communication interface 810. The communication interface 810 can include hardware, software, or both. The communication interface 810 provides one or more interfaces for communication (such as, for example, packet-based communication) between the computing device and one or more other computing devices or one or more networks. As an example, and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI. The computing device 800 can further include a bus 812. The bus 812 can include hardware, software, or both that connects components of the computing device 800 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A non-transitory computer-readable medium storing instructions that, when executed by at least one processor, cause a computing device to:
   determine a position of a first end of a first structural member of an animated character, a second end of the first structural member being connected to a first end of a second structural member by a joint;
   determine a position of a second end of the second structural member;
   determine, based on the position of the first end of the first structural member and the position of the second end of the second structural member of the animated character, a first inverse kinematic solution of a first joint position and a second inverse kinematic solution of a second joint position;
   determine a modified joint position by blending the first inverse kinematic solution of the first joint position and the second inverse kinematic solution of the second joint position according to blending weights determined based on an angle of the first structural member of the animated character; and
   generate a representation of the animated character based on the position of the first end of the first structural member, the position of the second end of the second structural member, and the modified joint position.

2. The non-transitory computer-readable medium of claim 1, further comprising instructions that, when executed by the at least one processor, cause the computing device to identify the angle of the first structural member of the animated character by identifying an angle between a reference plane associated with the animated character and a line connecting the position of the first end of the first structural member with the first joint position or the second joint position.

3. The non-transitory computer-readable medium of claim 1, further comprising instructions that, when executed by the at least one processor, cause the computing device to determine the modified joint position in response to determining that the angle of the first structural member of the animated character falls within a blending region.

4. The non-transitory computer-readable medium of claim 3, wherein the blending region comprises a range of angles between a first angle and a second angle and further comprising instructions that, when executed by the at least one processor, cause the computing device to determine that the angle of the first structural member of the animated character falls within the blending region by determining that the angle of the first structural member is between the first angle and the second angle.

5. The non-transitory computer-readable medium of claim 4, further comprising instructions that, when executed by the at least one processor, cause the computing device to determine the first angle and the second angle of the blending region by:
   identifying an angle limit of the first structural member indicating a central angle of the blending region;
   identifying a transition angle indicating an angle range relative to the angle limit of the first structural member; and
   determining the first angle and the second angle by applying the transition angle to the angle limit of the first structural member.

6. The non-transitory computer-readable medium of claim 4, further comprising instructions that, when executed by the at least one processor, cause the computing device to generate the blending weights based on proximity of the angle of the first structural member relative to the first angle and the second angle.

7. The non-transitory computer-readable medium of claim 6, further comprising instructions that, when executed by the at least one processor, cause the computing device to further generate the blending weights by applying a smooth step function to the first inverse kinematic solution of the first joint position and the second inverse kinematic solution of the second joint position based on the first angle, the second angle, and the angle of the first structural member.

8. The non-transitory computer-readable medium of claim 1, wherein:
   the position of the first end of the first structural member comprises a shoulder position;
   the position of the second end of the second structural member comprises a wrist position; and
   the joint comprises an elbow.

9. The non-transitory computer-readable medium of claim 8, wherein the animated character comprises an arm having an initial arm length and further comprising instructions that, when executed by the at least one processor, cause the computing device to generate the representation of the animated character based on the position of the second end of the second structural member, the position of the first end of the first structural member, and the modified joint position by generating a modified arm having a modified arm length shorter than the initial arm length.

10. The non-transitory computer-readable medium of claim 8, further comprising instructions that, when executed by the at least one processor, cause the computing device to:
    associate a first art layer with a first orientation of an arm of the animated character and associate a second art layer with a second orientation of the arm of the animated character;
    determine a switch point within a blending region at which an angle of the first structural member of the animated character triggers a switch between the first art layer and the second art layer; and
    generate for display the first art layer or the second art layer by comparing the angle of the first structural member and the switch point.

11. A system comprising:
    at least one memory device storing an animated character comprising a first structural member, a second structural member, and a joint connecting a second end of the first structural member to a first end of the second structural member; and
    at least one processor configured to cause the system to:
       determine a position of a first end of the first structural member;
       determine a position of a second end of the second structural member;
       determine, based on the position of the first end of the first structural member and the position of the second end of the second structural member, a first inverse kinematic solution of a first joint position and a second inverse kinematic solution of a second joint position different from the first joint position;
       determine an angle of the first structural member based on the position of the first end of the first structural member and the first joint position or the second joint position;
       determine a modified joint position by blending the first inverse kinematic solution of the first joint position and the second inverse kinematic solution of the second joint position according to blending weights determined based on the angle of the first structural member; and generate a representation of the animated character based on the position of the first end of the first structural member, the position of the second end of the second structural member, and the modified joint position.

12. The system of claim 11, wherein the at least one processor is configured to cause the system generate the first inverse kinematic solution by constraining one or more of a length of the first structural member, a length of the second structural member, the position of the first end of the first structural member, or the position of the second end of the second structural member.

13. The system of claim 11, wherein the at least one processor is configured to cause the system to generate the first inverse kinematic solution utilizing iterative optimization.

14. The system of claim 11, wherein one or more of the first structural member or the second structural member is flexible.

15. The system of claim 11, wherein:
the first structural member comprises an upper arm;
the second structural member comprises a lower arm;
the position of the first end of the first structural member comprises a shoulder position;
the position of the second end of the second structural member comprises a wrist position; and
the joint comprises an elbow.

16. A computer-implemented method comprising:
identifying a user interaction to move one or more portions of an animated character in a two-dimensional digital animation;
based on the user interaction, identifying a first joint position and a second joint position of the animated character;
determining, based on the first joint position and the second joint position, a first inverse kinematic solution of a first middle joint position and a second inverse kinematic solution of a second middle joint position;
generating the animated character having a blended middle joint position by blending the first inverse kinematic solution of the first middle joint position and the second inverse kinematic solution of the second middle joint position according to blending weights determined based on an angle of a first structural member of the animated character extending from the first joint position; and
providing the animated character having the blended middle joint position for display as part of the two-dimensional digital animation.

17. The computer-implemented method of claim 16, wherein:
the first joint position includes a position of a first end of the first structural member of the animated character; and
the second joint position includes a position of a second end of a second structural member of the animated character.

18. The computer-implemented method of claim 16, wherein the blended middle joint position is spatially positioned between the first middle joint position and the second middle joint position.

19. The computer-implemented method of claim 16, wherein the animated character comprises an arm having an initial arm length and the computer-implemented method further comprises generating the animated character based on the first joint position, the second joint position, and the blended middle joint position by generating a modified arm having a modified arm length different from the initial arm length.

20. The computer-implemented method of claim 16, wherein:
the first joint position comprises a shoulder position;
the second joint position comprises a wrist position; and
a middle joint position comprises an elbow position.

* * * * *